US009524537B2

(12) United States Patent
Takagi et al.

(10) Patent No.: US 9,524,537 B2
(45) Date of Patent: Dec. 20, 2016

(54) DISPLAY CONTROL APPARATUS AND METHOD, IMAGE DISPLAY APPARATUS, AND NON-TRANSITORY COMPUTER READABLE MEDIUM FOR CONTROLLING A DISPLAYED IMAGE

(71) Applicant: FUJI XEROX CO., LTD., Minato-ku, Tokyo (JP)

(72) Inventors: Tomohito Takagi, Kanagawa (JP); Yasushi Ichinowatari, Kanagawa (JP); Yu Mishima, Kanagawa (JP); Yuzo Aoshima, Minato-ku (JP); Yuki Okabe, Minato-ku (JP); Chinatsu Hisamoto, Minato-ku (JP)

(73) Assignee: FUJI XEROX CO., LTD., Tokyo (JP)

( * ) Notice: Subject to any disclaimer, the term of this patent is extended or adjusted under 35 U.S.C. 154(b) by 269 days.

(21) Appl. No.: 13/859,330

(22) Filed: Apr. 9, 2013

(65) Prior Publication Data
US 2014/0092141 A1    Apr. 3, 2014

(30) Foreign Application Priority Data

Sep. 28, 2012    (JP) ................. 2012-218670

(51) Int. Cl.
*G06T 3/40*    (2006.01)
*G06F 3/0482*    (2013.01)
*G06F 3/0488*    (2013.01)

(52) U.S. Cl.
CPC .............. *G06T 3/40* (2013.01); *G06F 3/0482* (2013.01); *G06F 3/04883* (2013.01); *G06F 2203/04806* (2013.01); *G06F 2203/04808* (2013.01)

(58) Field of Classification Search
CPC ...................................................... G06T 3/40
See application file for complete search history.

(56) References Cited

U.S. PATENT DOCUMENTS 6,958,749 B1    10/2005    Matsushita et al.
2006/0156246 A1    7/2006    Williams et al.
(Continued)

FOREIGN PATENT DOCUMENTS

JP    10063462 A    3/1998
JP    2001-134382 A    5/2001
(Continued)

OTHER PUBLICATIONS

Communication dated Dec. 1, 2015, issued by the Japan Patent Office in corresponding Japanese Application No. 2012-218670.
(Continued)

*Primary Examiner* — Jeffery A Brier
(74) *Attorney, Agent, or Firm* — Sughrue Mion, PLLC

(57) ABSTRACT

A display control apparatus includes a first controller and a second controller. The first controller performs control to divide a display region of a display into divided regions arranged in a predetermined direction and to display images of determined attributes in the divided regions. The display includes a specifying unit that specifies a position in the display region and an operation on an image displayed in the display region. The second controller performs, in response to detection of specification of a predetermined operation on the displayed image subsequent to specification of a position in at least one divided region or in at least one boundary region between divided regions, enlargement control of enlarging or size reduction control of reducing the size of a target region (the divided region or a divided region adjacent to the boundary region) and an image displayed in the target region.

4 Claims, 25 Drawing Sheets

(56) References Cited

U.S. PATENT DOCUMENTS

| | | | |
|---|---|---|---|
| 2008/0244450 A1 | 10/2008 | Hisada et al. | |
| 2010/0088641 A1* | 4/2010 | Choi | 715/828 |
| 2010/0245651 A1* | 9/2010 | Minamino | 348/333.05 |
| 2011/0122078 A1* | 5/2011 | Kasahara | 345/173 |
| 2011/0163968 A1 | 7/2011 | Hogan | |
| 2011/0246942 A1* | 10/2011 | Misawa | 715/830 |
| 2012/0179997 A1 | 7/2012 | Miyazaki | |
| 2013/0036382 A1* | 2/2013 | Yuan et al. | 715/815 |
| 2013/0135234 A1* | 5/2013 | Hisano | G06F 3/017 345/173 |
| 2013/0205210 A1* | 8/2013 | Jeon | G06F 3/04883 715/716 |

FOREIGN PATENT DOCUMENTS

| | | |
|---|---|---|
| JP | 2006195970 A | 7/2006 |
| JP | 2007328456 A | 12/2007 |
| JP | 2008-009759 A | 1/2008 |
| JP | 2008-243128 A | 10/2008 |
| JP | 2010-231463 A | 10/2010 |
| JP | 2010-231635 A | 10/2010 |
| JP | 2010250768 A | 11/2010 |
| JP | 2012145980 A | 8/2012 |
| JP | 2012181708 A | 9/2012 |

OTHER PUBLICATIONS

Communication dated Jul. 5, 2016, issued by the Japan Patent Office in corresponding Japanese Application No. 2012-218670.

\* cited by examiner

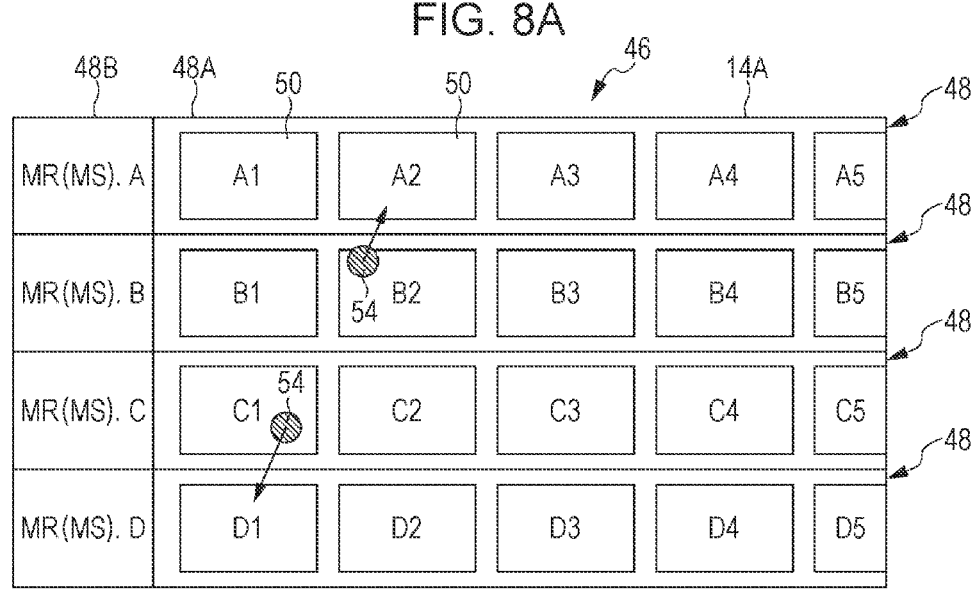
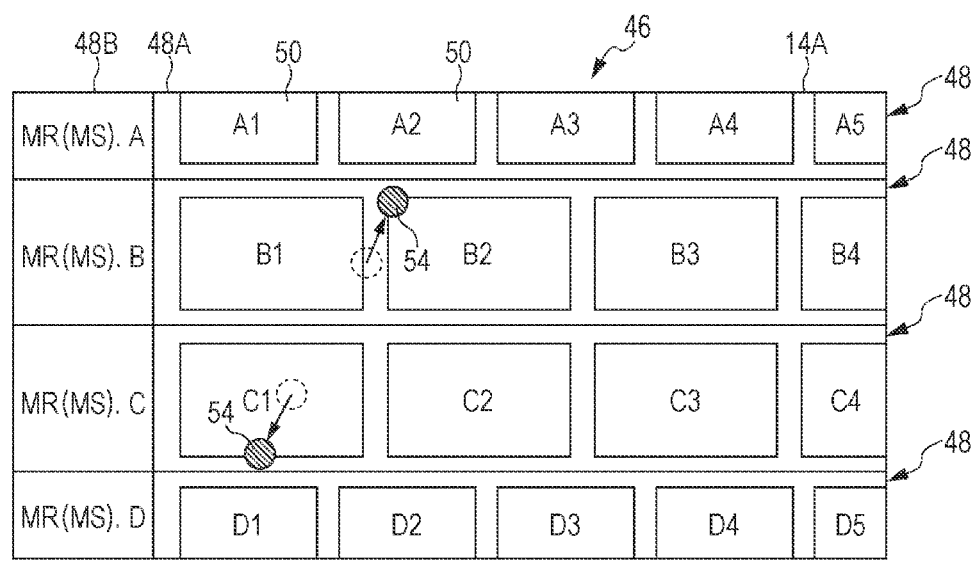

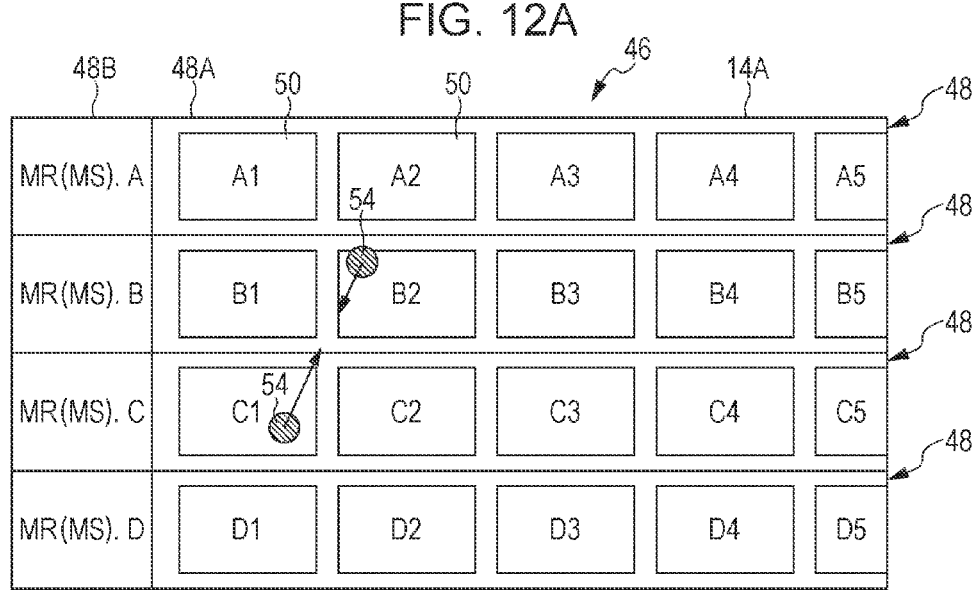
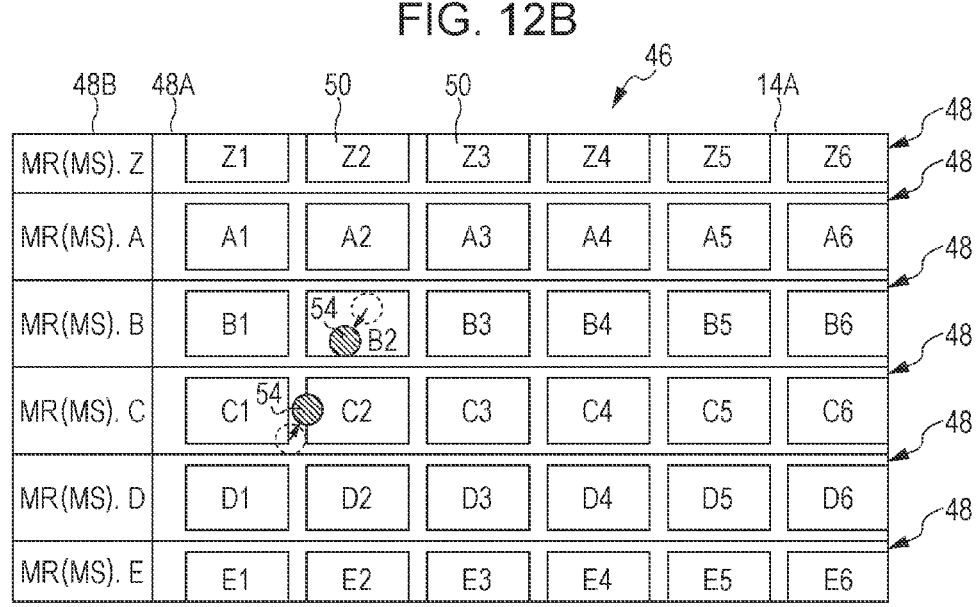

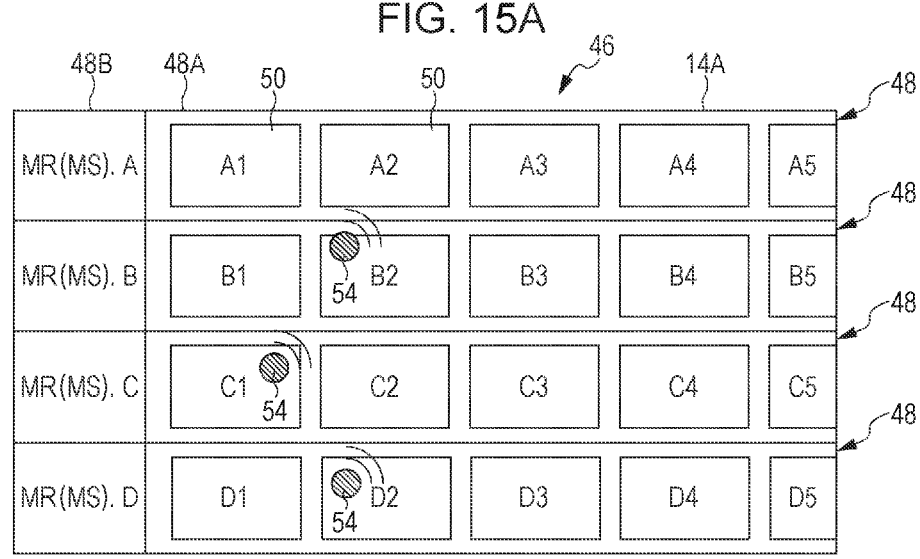
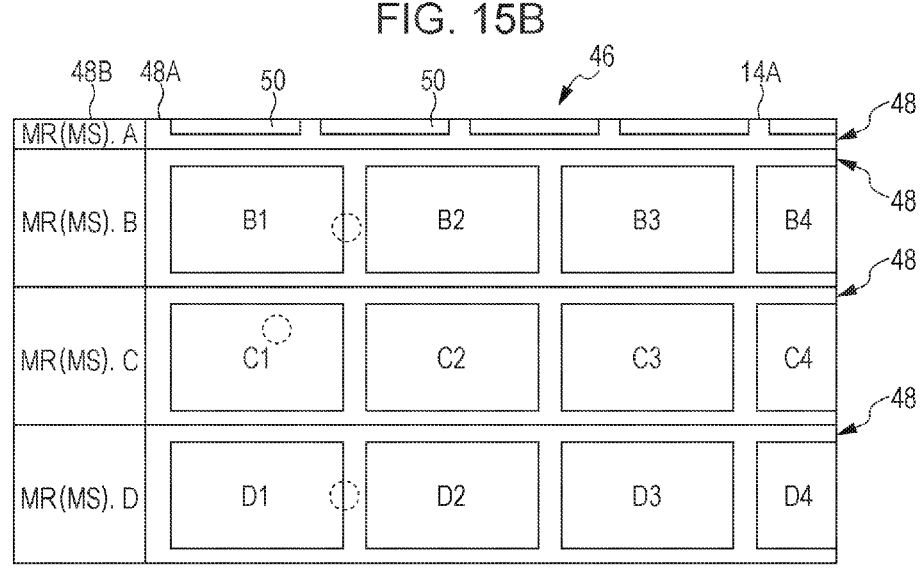

DISPLAY CONTROL APPARATUS AND METHOD, IMAGE DISPLAY APPARATUS, AND NON-TRANSITORY COMPUTER READABLE MEDIUM FOR CONTROLLING A DISPLAYED IMAGE

CROSS-REFERENCE TO RELATED APPLICATIONS

This application is based on and claims priority under 35 USC 119 from Japanese Patent Application No. 2012-218670 filed Sep. 28, 2012.

BACKGROUND

Technical Field

The present invention relates to a display control apparatus and method, an image display apparatus, and a non-transitory computer readable medium.

SUMMARY

According to an aspect of the invention, there is provided a display control apparatus including a first controller and a second controller. The first controller performs control to divide a display region of a display into multiple divided regions arranged in a predetermined direction and to display images of determined attributes in the individual divided regions. The display region displays an image. The display includes a specifying unit that specifies a position in the display region and an operation on the image displayed in the display region. Each of the divided regions displays an image whose attribute is any one of the attributes. The second controller performs, in response to detection of specification of a predetermined operation on the displayed image subsequent to at least one of specification of a position in at least one divided region and specification of a position in at least one boundary region indicating a boundary between divided regions, the specification being performed via the specifying unit, enlargement control of enlarging or size reduction control of reducing the size of a target region and an image displayed in the target region. The target region is at least one of the divided region in which the position is specified and a divided region adjacent to the boundary region in which the position is specified.

BRIEF DESCRIPTION OF THE DRAWINGS

Exemplary embodiments of the present invention will be described in detail based on the following figures, wherein:

FIGS. 8A and 8B are diagrams provided for describing the state of an operation performed on the image list screen according to the first exemplary embodiment;

FIGS. 12A and 12B are diagrams provided for describing the state of an operation performed on the image list screen according to the first exemplary embodiment;

FIGS. 15A and 15B are diagrams provided for describing the state of an operation performed on the image list screen according to the second exemplary embodiment;

DETAILED DESCRIPTION

Hereinafter, exemplary embodiments of the invention will be described in detail with reference to the drawings. Note that, in the following exemplary embodiments, the case in which the exemplary embodiments are applied to a smartphone will be described by way of example. However, the exemplary embodiments are not limited to this case, and the exemplary embodiments are applicable to other devices with touch panel displays, such as other mobile phones, personal digital assistants (PDAs), and portable game machines.

The smartphone according to the exemplary embodiments presents multiple menu items to a user to prompt the user to select a desired menu item, thereby activating an application program or software corresponding to the selected menu item. However, the smartphone according to the exemplary embodiments is not limited to such a smartphone. That is, the smartphone according to the exemplary embodiments may activate, in response to an instruction to activate an application program or software, a list displaying function, which will be described later, on the basis of the application program or software given in the instruction. Alternatively, the smartphone according to the exemplary embodiments may activate a list displaying function, which will be described later, by using an application program or software activated by a web browsing function in response to specification of a uniform resource locator (URL).

First Exemplary Embodiment

Figure 1:
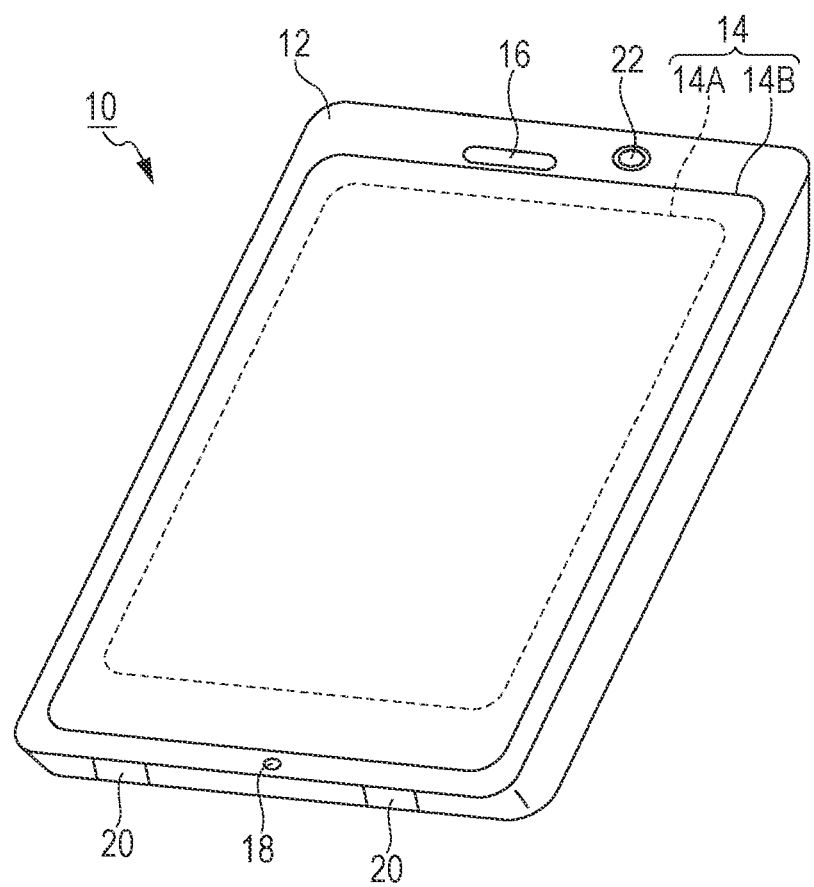
FIG. 1 is a perspective view illustrating the external appearance of a smartphone according to exemplary embodiments.

As illustrated in FIG. 1, a smartphone 10 according to a first exemplary embodiment includes a plate-shaped housing 12. On one of the faces of the housing 12, the smartphone 10 includes a display input unit 14 including a display panel 14A serving as a display and an operation panel 14B configured as a touch panel (specifying unit), which are integrated with each other. The housing 12 further includes a loudspeaker 16, a microphone 18, an operation unit 20, and a camera unit 22. Note that the shape of the housing 12 is not limited to the plate shape, and the housing 12 may adopt a configuration including, for example, a folding structure or a sliding structure.

Figure 2:
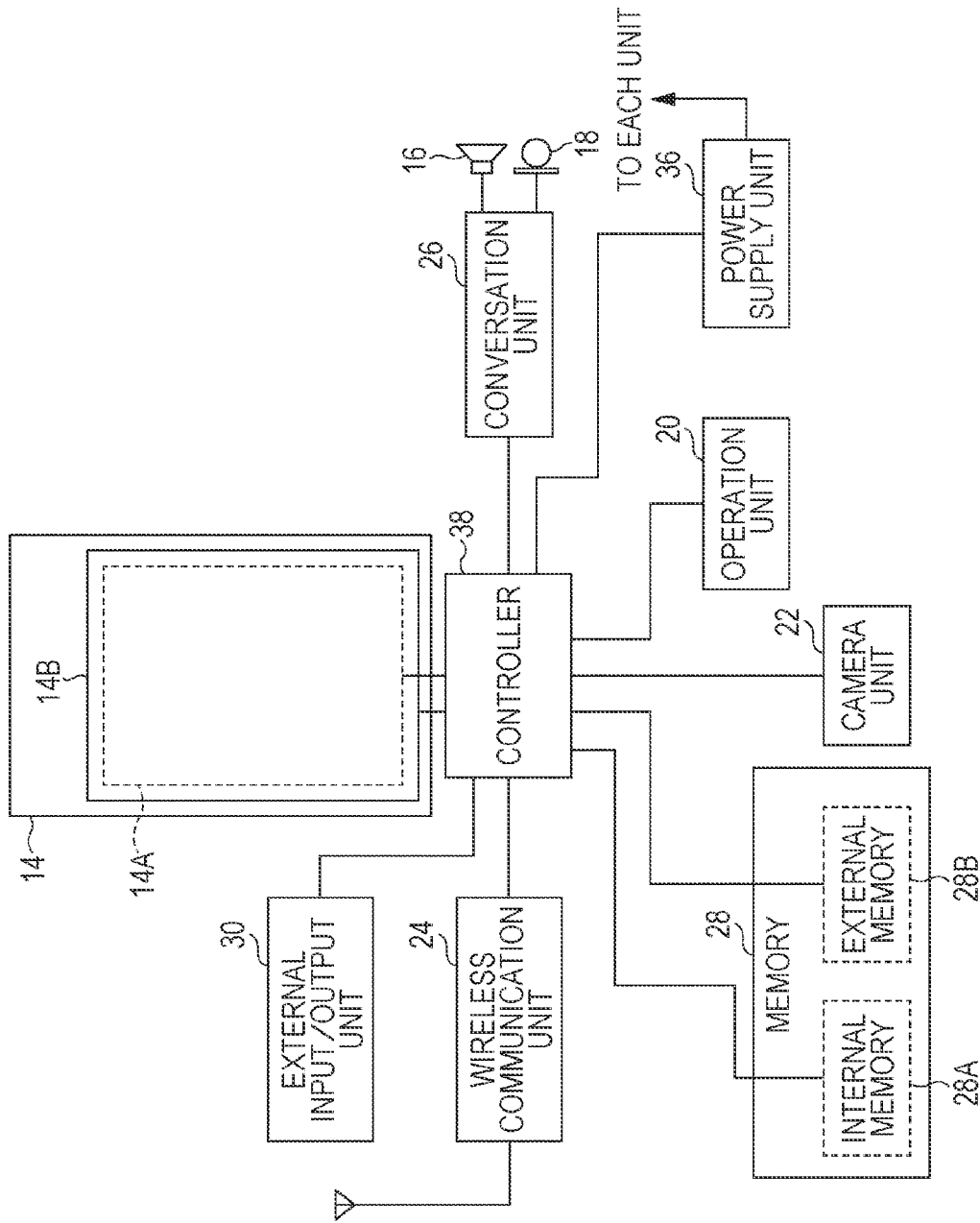
FIG. 2 is a block diagram illustrating the configuration of the smartphone according to the exemplary embodiments.

As illustrated in FIG. 2, the smartphone 10 includes, as major elements, the display input unit 14, the operation unit 20, and the camera unit 22, which are described above, and a wireless communication unit 24, a conversation unit 26, a memory 28, an external input/output unit 30, a power supply unit 36, and a controller 38. Note that the smartphone 10 has, as a main function, a wireless communication function of performing mobile wireless communication with a base station device via a mobile communication network.

The wireless communication unit 24 is configured to perform wireless communication with the base station device contained in the mobile communication network in response to an instruction from the controller 38. Using wireless communication, the wireless communication unit 24 transmits and receives various types of file data including audio data and image data, e-mail data, or the like to and from an external device, and receives web data, streaming data, or the like from an external device.

The display input unit 14 is a so-called touch panel display, under control of the controller 38, which visually communicates information to a user by displaying images (still images and moving images), character information, or the like, and detects a user operation performed in response to the displayed information.
As described above, the display input unit 14 according to the first exemplary embodiment includes the display panel 14A and the operation panel 14B.

Here, the display panel 14A uses a liquid crystal display (LCD), an organic electro-luminescence display (OELD), or the like as a display device. The operation panel 14B is a device that is stacked on the display panel 14A so that an image displayed on a display face of the display panel 14A is visually recognizable and that detects one or multiple coordinates operated by a finger of a user or a touch pen. In response to operating the device by using a finger of a user or a touch pen, the device outputs a detection signal generated in response to the operation to the controller 38. Next, on the basis of the received detection signal, the controller 38 detects the operated position (coordinates) on the display panel 14A.

Although the size of a display region of the display panel 14A may completely coincide with the size of the display panel 14A, the two sizes may not necessarily coincide with each other. A position detecting method adopted by the operation panel 14B includes a matrix switch method, a resistive film method, a surface acoustic wave method, an infrared method, an electromagnetic induction method, an electrostatic capacitance method, or the like, any of which is adoptable.

The conversation unit 26 includes the loudspeaker 16 and the microphone 18, which are described above. The conversation unit 26 converts the voice of a user input through the microphone 18 into audio data that may be processed by the controller 38, and outputs the audio data to the controller 38. The conversation unit 26 also decodes audio data received by the wireless communication unit 24 or the external input/output unit 30, and outputs sound, which is the decoded audio data, from the loudspeaker 16. As illustrated in FIG. 1, for example, the loudspeaker 16 and the microphone 18 are mounted on the same face as that on which the display input unit 14 is provided.

The operation unit 20 accepts an instruction from a user. For example, as illustrated in FIG. 1, the operation unit 20 is mounted on a lateral face of the housing 12 of the smartphone 10. The operation unit 20 is a push-button switch that is turned on when pressed with a finger or the like, and that enters an off state due to the resilience of a spring or the like when the finger is released from the switch.

The memory 28 stores a control program executed by the controller 38, control data, application software, address data that corresponds the name of a communication partner with a telephone number or the like, and transmitted and received e-mail data. The memory 28 also stores web data downloaded by web browsing, and downloaded content data. Further, the memory 28 temporarily stores streaming data or the like.

Here, the memory 28 according to the first exemplary embodiment includes an internal memory 28A included in the smartphone 10 and an external memory 28B with an external memory slot detachably attached to the smartphone 10. The internal memory 28A and the external memory 28B configuring the memory 28 are realized using flash memory type storage media or the like. Alternatively, the storage media may be hard disk type, multimedia card micro type, or card type memories (such as microSD (registered trademark) memories). Alternatively, the memories may be storage media such as random-access memories (RAMs) or read-only memories (ROMs).

The external input/output unit 30 plays the role of an interface with an external device connected to the smartphone 10. The external input/output unit 30 according to the first exemplary embodiment directly or indirectly connects to another external device in accordance with a predetermined communication standard or the like. The communication standard or the like is, for example, Universal Serial Bus (USB), Institute of Electrical and Electronic Engineers (IEEE) 1394, or a network (such as the Internet, a wireless local area network (LAN), or Bluetooth (registered trademark)). Alternatively, the communication standard or the like may be radio frequency identification (RFID) or Infrared Data Association (IrDA) (registered trademark). Further, the communication standard or the like may be ultra-wideband (UWB) (registered trademark) or Zigbee (registered trademark).

Here, the external device connected to the smartphone 10 according to the first exemplary embodiment is, for example, a wired/wireless headset, a wired/wireless external charger, a wired/wireless data port, a memory card connected via a card socket, or the like. The external device may be a subscriber identity module (SIM) card, a user identity module (UIM) card, or an external audio-video device connected via an audio-video input/output (I/O) terminal. Alternatively, the external device may be a wirelessly connected external audio-video device, a wired/wirelessly connected smartphone, a wired/wirelessly connected personal computer, a wired/wirelessly connected PDA, or an earphone. The external input/output unit 30 according to the first exemplary embodiment communicates data transmitted from these external devices to the elements included in the smartphone 10, and transmits data in the smartphone 10 to the external devices.

The power supply unit 36 is configured to supply electric power accumulated in a battery (not illustrated) to the units of the smartphone 10 in response to an instruction from the controller 38.

Further, the controller 38 includes a microprocessor. The controller 38 is configured to operate in accordance with a control processing program and control data stored in the memory 28, and collectively controls the units of the smartphone 10. In order to perform audio communication or data communication via the wireless communication unit 24, the controller 38 also has a mobile communication controlling function of controlling the units of a communication system, and an application processing function.

Here, the application processing function is realized by the controller 38 operating in accordance with application software stored in the memory 28. The application processing function includes, for example, an infrared communication function of controlling the external input/output unit 30 and performing data communication with a device facing the smartphone 10, an e-mail function of transmitting and receiving e-mail, and a web browsing function of browsing web pages.

Also, the controller 38 has an image processing function of displaying video on the display input unit 14 on the basis of image data (still image and moving image data) such as received data or downloaded streaming data. Note that the image processing function described here is the function of the controller 38 decoding the image data, applying image processing to the decoded image data, and displaying an image on the display input unit 14.

Further, the controller 38 executes display control of various types of information on the display panel 14A, and operation detection control that detects a user operation performed via the operation unit 20, the operation panel 14B, or the like.

By executing the above-described display control, the controller 38 displays an operation unit represented in software, such as an icon for activating application software or a scroll bar, or a window for writing e-mail. Note that the scroll bar described here is an operation unit represented in software for accepting an instruction to move a display part of an image that is too large to fit into the display region of the display panel 14A.

By executing the above-described operation detection control, the controller 38 detects a user operation performed via the operation unit 20, or accepts an operation performed on the icon via the operation panel 14B, or a character string entered in an entry column of the window.

Further, the controller 38 detects a gesture operation performed on the operation panel 14B, and executes a preset function in accordance with the detected gesture operation. Note that the gesture operation described here is not a conventional simple touch operation, but an operation that renders a track with a finger or the like, that simultaneously specifies multiple positions, or, by combining these operations, that renders a track for at least one of multiple positions.

The camera unit 22 is a digital camera that captures an image using an imaging element such as a complementary metal oxide semiconductor (CMOS) or a charge-coupled device (CCD). Under control of the controller 38, the camera unit 22 converts image data, obtained by capturing an image, to image data compressed in accordance with a predetermined standard such as the Joint Photographic Experts Group (JPEG). The camera unit 22 also records the converted image data in the memory 28, or outputs the image data to an external device via the external input/output unit 30, the wireless communication unit 24, or the like. In the smartphone 10, the camera unit 22 is mounted on the same face as that on which the display input unit 14 is mounted. However, the position at which the camera unit 22 is mounted is not limited to this position. The camera unit 22 may be mounted on the back of the display input unit 14, or multiple camera units 22 may be mounted. When multiple camera units 22 are mounted, the camera unit 22 to be used to capture an image is switched from one to another and the single camera unit 22 is used to capture an image, or multiple camera units 22 are simultaneously used to capture images.

Here, the camera unit 22 according to the first exemplary embodiment is used for various functions of the smartphone 10. For example, an image obtained with the camera unit 22 is displayed on the display panel 14A, or an image obtained with the camera unit 22 is used as an operation input on the operation panel 14B.

Further, the camera unit 22 adds audio information obtained by the microphone 18 (which may be converted by the controller 38 or the like from audio to text information) or the like to still image or moving image data. The camera unit 22 records the image data with the audio information added thereto in the memory 28, or outputs the image data with the audio information added thereto to an external device via the external input/output unit 30 or the wireless communication unit 24.

By the way, when image data is stored in at least one of the internal memory 28A and the external memory 28B and an instruction to display a list of pieces of image data is given in response to a user operation, the smartphone 10 according to the first exemplary embodiment controls the display panel 14A to display the list. In the first exemplary embodiment, image data obtained by capturing an image with an image capturing unit such as the camera unit 22 is applied as the above-described image data.

In this manner, the smartphone 10 according to the first exemplary embodiment displays a list of images indicated by the above-described image data. However, the smartphone 10 is not limited to this example. Alternatively, a list of images of icons representing document files, audio files, application programs, or the like stored in the memory 28 may be displayed.

Figure 3:
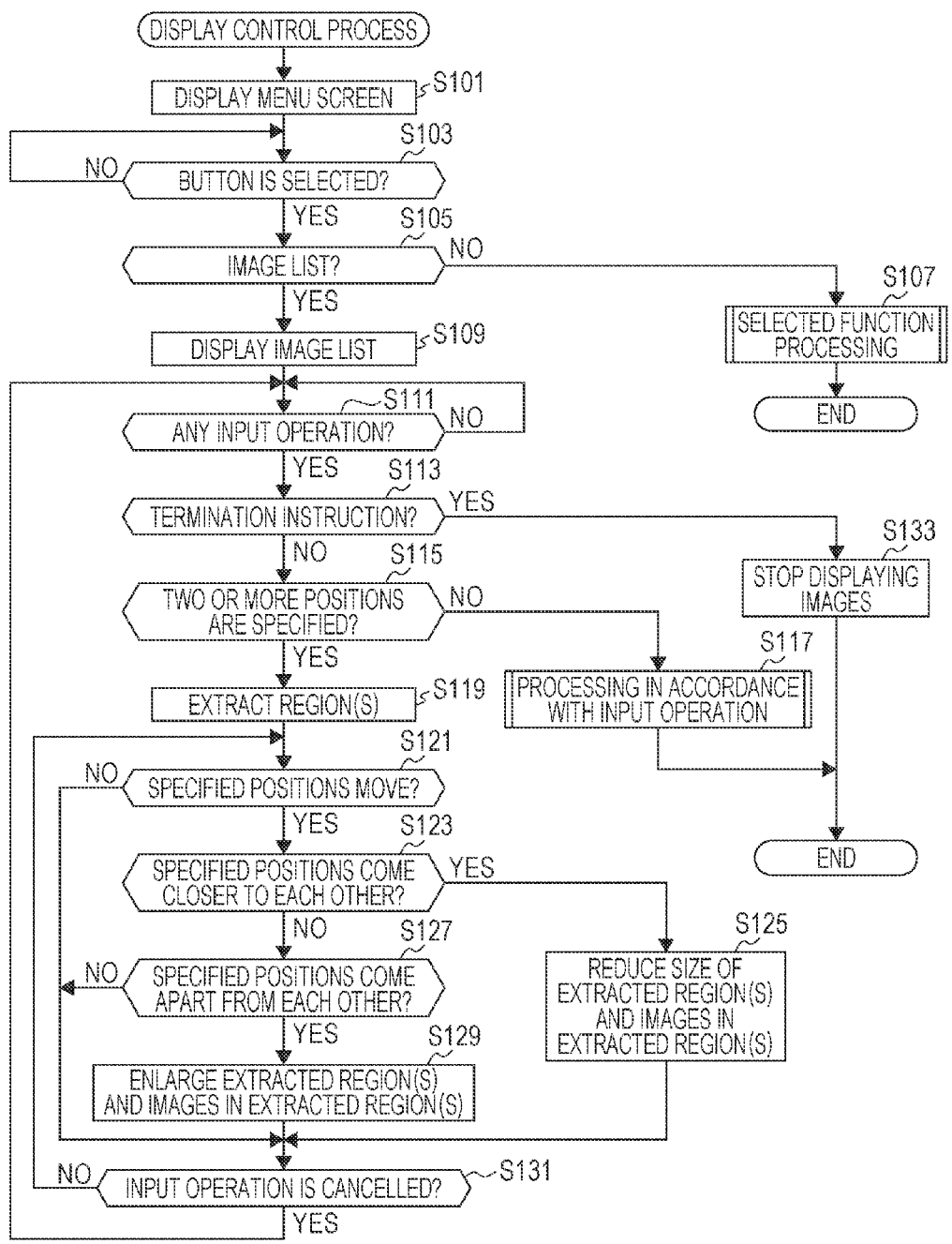
FIG. 3 is a flowchart illustrating the flow of a process of a display control processing program according to a first exemplary embodiment.

Next, referring to FIG. 3, the operation of the smartphone 10 according to the first exemplary embodiment will be described. FIG. 3 is a flowchart illustrating the flow of a process of a display control processing program executed by the controller 38 of the smartphone 10 in response to an execution instruction input via the operation panel 14B or the operation unit 20. This program is stored in advance in a predetermined region of the internal memory 28A.

In step S101 of FIG. 3, the controller 38 performs control to display a menu screen serving as a start point of a screen transition on the display panel 14A.

Figure 4:
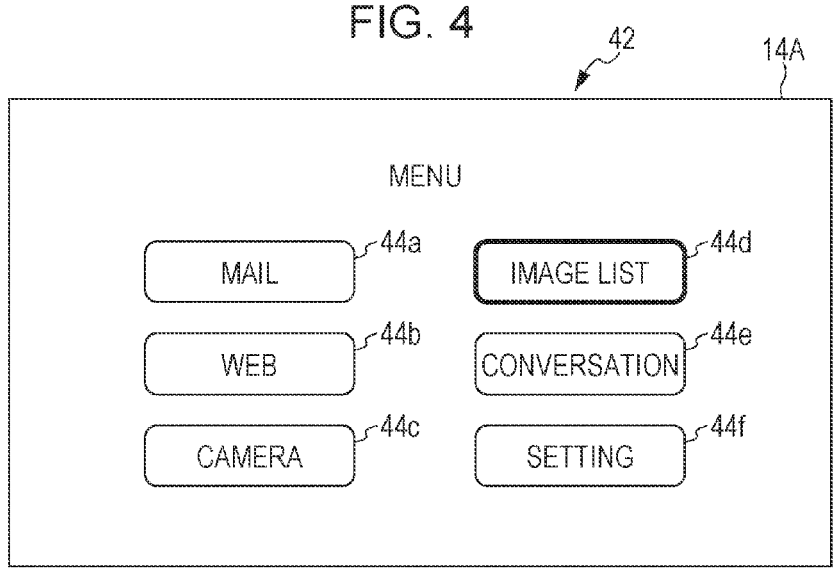
FIG. 4 is a front view illustrating an exemplary configuration of a menu screen according to the first exemplary embodiment.

As illustrated in FIG. 4, a menu screen 42 according to the first exemplary embodiment includes a mail button 44a for accepting an instruction to activate a mail function, and a web button 44b for accepting an instruction to activate a web browsing function. The menu screen 42 also includes a camera button 44c for accepting an instruction to activate a camera function, and an image list button 44d for accepting an instruction to activate the above-described list displaying function. The menu screen 42 also includes menu buttons such as a conversation button 44e for accepting an instruction to activate a conversation function, and a setting button 44f for accepting an instruction to activate various setting functions.

On the menu screen 42, a user selects one of menu items by touching the top of a menu button corresponding to a function to be activated. In response to this, the controller 38 activates the function corresponding to the selected menu button.

In step S103, the process waits for the user to select one of the menu buttons. In step S105, it is determined whether the menu button selected by the user is the image list button 44d. When the determination in step S105 is negative, the process proceeds to step S107, executes a function corresponding to the selected menu button, and terminates the display control processing program. In contrast, when the determination in step S105 is affirmative, the process proceeds to step S109.

In step S109, the controller 38 performs control to display, on the display panel 14A, an image list screen displaying a list of images indicated by image data stored in the memory 28 (hereinafter referred to as "to-be-displayed images").

Figure 5:
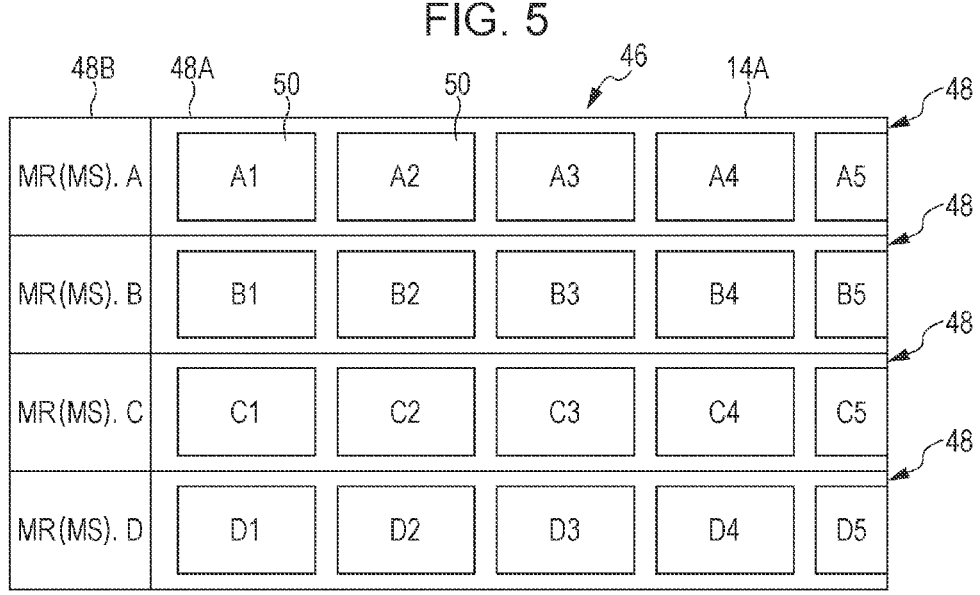
FIG. 5 is a front view illustrating an exemplary configuration of an image list screen according to the first exemplary embodiment.

As illustrated in FIG. 5, an image list screen 46 according to the first exemplary embodiment is the display region of the display panel 14A, which is divided into multiple divided regions 48 divided in a predetermined direction (the vertical direction in front view in FIG. 5 in the first exemplary embodiment; hereinafter referred to as the "dividing direction"). The divided regions 48 are further divided into image display regions 48A displaying to-be-displayed images 50, and attribute display regions 48B displaying attributes corresponding to the to-be-displayed images 50 displayed in the image display regions 48A.

The to-be-displayed images 50 are allocated to the divided regions 48 according to predetermined attributes and are displayed in the divided regions 48. Here, the to-be-displayed images 50 allocated according to the attributes are arranged in a direction intersecting the above-described dividing direction (the horizontal direction in front view in FIG. 5 in the first exemplary embodiment; hereinafter referred to as the "arrangement direction") and displayed in the divided regions 48.

In the smartphone 10 according to the first exemplary embodiment, images indicated by image data obtained by capturing images with the camera unit 22 of the smartphone 10, or images indicated by image data stored in the memory 28 are applied as the to-be-displayed images 50. In the smartphone 10, images indicated by image data obtained by capturing images and input from an external device via the wireless communication unit 24, the external input/output unit 30, or the like are also applied as the to-be-displayed images 50. Information indicating photographers are added to individual pieces of image data indicating the to-be-displayed images 50 applied in the smartphone 10 according to the first exemplary embodiment, and the image data with the additional information is stored. In the first exemplary embodiment, the photographers are applied as the above-described attributes.

In step S111, the controller 38 enters standby until an input operation is performed on one of the operation panel 14B and the operation unit 20. In step S113, it is determined whether the input operation is an input operation of giving an instruction to terminate the display control processing program. In the smartphone 10 according to the first exemplary embodiment, when the operation unit 20 positioned on the left side in front view of the smartphone 10 is pressed, processing being executed at that time is terminated. Therefore, determination of whether the operation unit 20 is pressed enables determination of whether the input operation is an input operation of giving an instruction to terminate the display control processing program.

When the determination in step S113 is negative, the process proceeds to step S115, and it is determined whether the input operation is an input operation of specifying two or more positions. At this time, the controller 38 determines that the input operation is an input operation of specifying two or more positions when two or more positions in at least one divided region 48 are touched via the operation panel 14B.

When the determination in step S115 is negative, the process proceeds to step S117, processing in accordance with the input operation is executed, and the display control processing program is terminated. The processing in accordance with the input operation is, for example, when one of the to-be-displayed images 50 is specified by performing an input operation of specifying one position, processing to enlarge the specified to-be-displayed image 50 and displaying the enlarged image 50 in the entire display region of the display panel 14A.

In contrast, when the determination in step S115 is affirmative, the process proceeds to step S119, and extracts a divided region 48 (hereinafter referred to as an "extracted region") displayed at the positions (hereinafter referred to as "specified positions") on the operation panel 14B specified on the operation panel 14B. In the first exemplary embodiment, when another divided region 48 is displayed between multiple divided regions 48 displayed at the specified positions, this other divided region 48 also serves as an extracted region. However, the process is not limited to this case. That is, even when another divided region 48 is displayed between multiple divided regions 48 displayed at the specified positions, only the divided regions 48 displayed at the specified positions may serve as extracted regions.

In step S121, it is determined whether the specified positions move in the dividing direction. At this time, the controller 38 determines that the specified positions move when the specified positions move from the originally specified positions at the time of processing in step S111 by a predetermined distance (such as 3 mm) or more in the dividing direction.

When the determination in step S121 is negative, the process proceeds to step S131 described later. In contrast, when the determination in step S121 is affirmative, the process proceeds to step S123, and it is determined whether the specified positions come closer to each other in the dividing direction. At this time, when there are three or more specified positions, it is determined that the specified positions come closer to each other when at least two specified positions come closer to each other in the dividing direction.

When the determination in step S123 is affirmative, the process proceeds to step S125, and the controller 38 performs control to reduce the size of the extracted region(s) in the dividing direction, and, in accordance with the size reduction of the extracted region(s), the controller 38 performs control to reduce the size of the to-be-displayed images 50 displayed in the extracted region(s), while maintaining the aspect ratio, and to display the size-reduced to-be-displayed images 50. At this time, it is preferable to reduce the size of the extracted region(s) at a reduction ratio in accordance with the amount of movement of the specified positions in the dividing direction. However, the size reduction is not limited to this case. The size reduction may be performed at a predetermined reduction ratio (such as ½ times). It is also preferable to reduce the size of the to-be-displayed images 50 at a reduction ratio at which the size of the divided region(s) 48 is reduced. However, the size reduction is not limited to this case. It is only necessary to reduce the size of the to-be-displayed images 50 to a size so as to be displayable inside the divided region(s) 48.

In contrast, when the determination in step S123 is negative, the process proceeds to step S127, and it is determined whether the specified positions come apart from each other in the dividing direction. At this time, when there are three or more specified positions, it is determined that the specified positions come apart from each other when at least two specified positions come apart from each other in the dividing direction.

When the determination in step S127 is negative, the process proceeds to step S131 described above. In contrast, when the determination in step S127 is affirmative, the process proceeds to step S129, and the controller 38 performs control to enlarge the extracted region(s) in the dividing direction, and, in accordance with the enlargement of the extracted region(s), the controller 38 performs control to enlarge the to-be-displayed images 50 displayed in the extracted region(s), while maintaining the aspect ratio, and to display the enlarged to-be-displayed images 50. At this time, it is preferable to enlarge the extracted region(s) at an enlargement ratio in accordance with the amount of movement of the specified positions in the dividing direction. However, the enlargement is not limited to this case. The enlargement may be performed at a predetermined enlargement ratio (such as 2 times). It is also preferable to enlarge the to-be-displayed images 50 at an enlargement ratio at which the divided region(s) 48 is/are enlarged. However, the enlargement is not limited to this case. It is only necessary to enlarge the to-be-displayed images 50 to a size so as to be displayable in the divided region(s) 48.

In step S131, it is determined whether touching of the operation panel 14B by the user is released, thereby determining whether the input operation is cancelled. When the determination in step S131 is negative, the process returns to step S121 described above. In contrast, when the determination in step S131 is affirmative, the process returns to step S111 described above.

In contrast, when the determination in step S113 is affirmative, the process proceeds to step S133, and the controller 38 controls the display panel 14A to stop displaying the image list screen 46, and terminates the display control processing program.

Figure 6A:
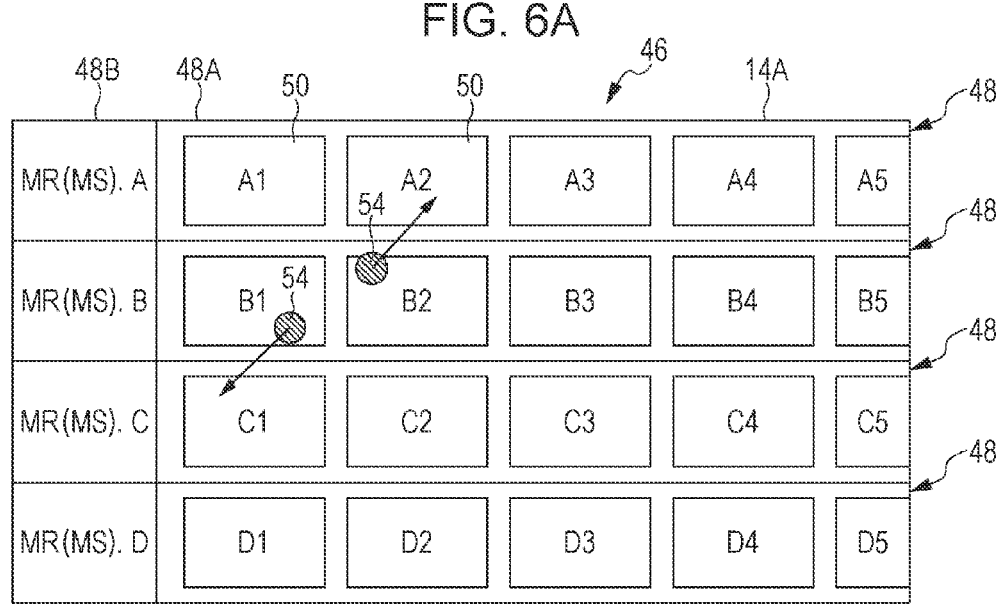
FIGS. 6A and 6B are diagrams provided for describing the state of an operation performed on the image list screen according to the first exemplary embodiment.

For example, as illustrated in FIG. 6A, it is assumed that two positions in a divided region 48 displaying to-be-displayed images 50 of photographer B serve as specified positions 54, and that the specified positions 54 move in a direction in which the specified positions 54 come apart from each other in the dividing direction. In this case, as illustrated in FIG. 6B, the controller 38 regards the divided region 48 as an extracted region, enlarges the extracted region in accordance with the movement of the specified positions 54, and enlarges and displays the to-be-displayed images 50 displayed in the extracted region in accordance with the enlargement of the extracted region.

Figure 6B:
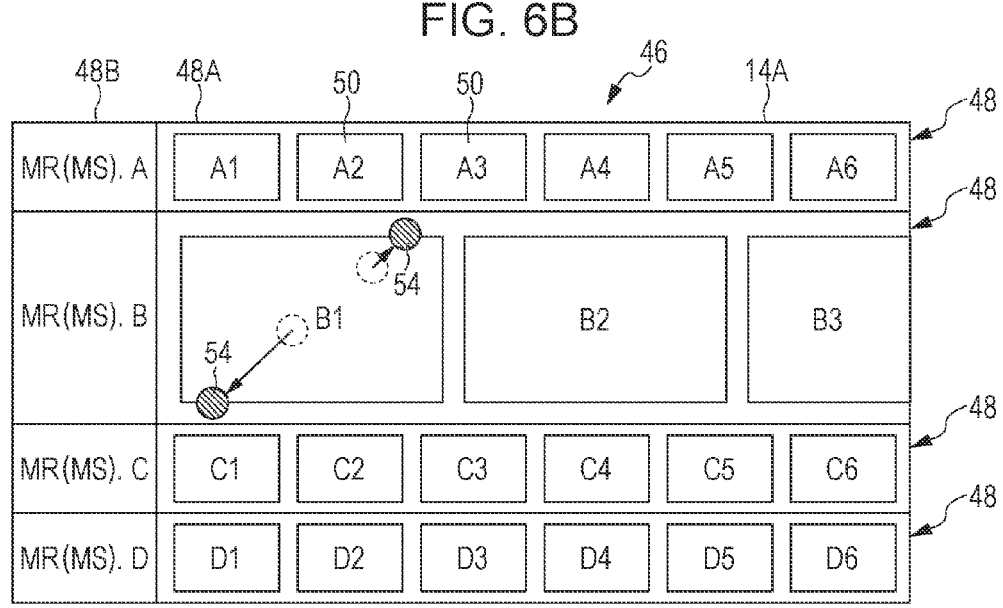

In the first exemplary embodiment, as illustrated in FIG. 6B, the controller 38 increases the reduction ratio as the enlargement ratio in the enlargement control increases in accordance with the enlargement of the extracted region, and reduces the size of divided regions 48 that are not extracted regions (hereinafter referred to as "not-extracted regions") in the dividing direction. Also, the controller 38 reduces the size of the to-be-displayed images 50 displayed in the not-extracted regions in accordance with the size reduction of the not-extracted regions, and displays the size-reduced to-be-displayed images 50. At this time, the controller 38 preferably reduces the size of the not-extracted regions in the dividing direction at a reduction ratio at which all the divided regions 48 displayed in the display region of the display panel 14A prior to processing performed to enlarge the above-described extracted region are displayed. Alternatively, the size of the not-extracted regions may be reduced at a predetermined reduction ratio.

Figure 7:
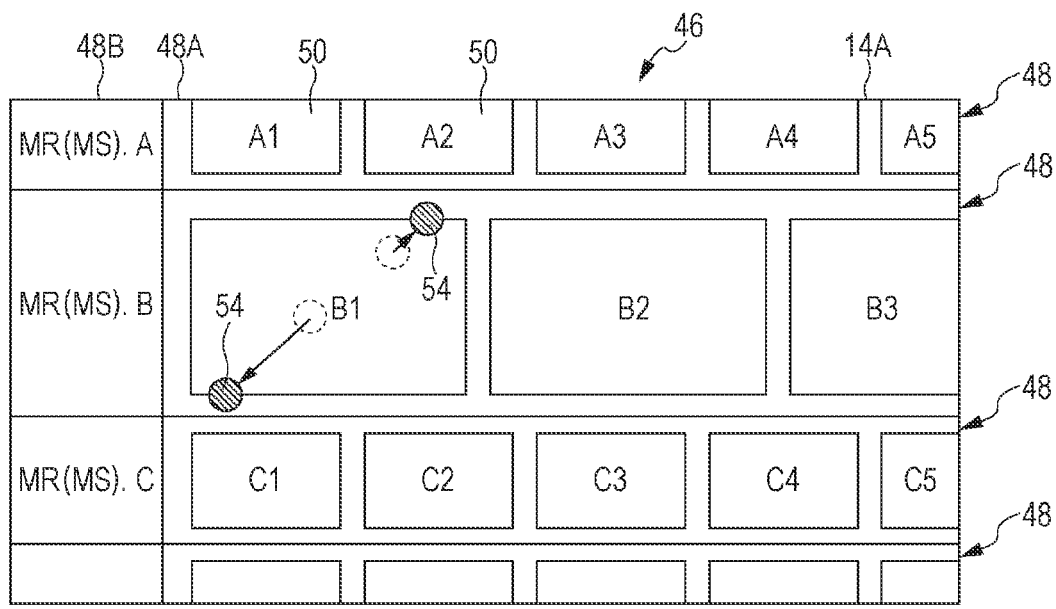
FIG. 7 is a diagram provided for describing the state of an operation performed on the image list screen according to the first exemplary embodiment.

As illustrated in FIG. 7, when enlarging the extracted region, the controller 38 may not reduce the size of the not-extracted regions and the to-be-displayed images 50 displayed in the not-extracted regions, and may display the not-extracted regions and the to-be-displayed images 50 at their original sizes.

For example, as illustrated in FIG. 8A, it is assumed that one position in the divided region 48 displaying the to-be-displayed images 50 of photographer B and one position in a divided region 48 displaying the to-be-displayed images 50 of photographer C serve as specified positions 54. It is also assumed that these specified positions 54 move in a direction in which the specified positions 54 come apart from each other in the dividing direction. In this case, as illustrated in FIG. 8B, the controller 38 regards the divided region 48 displaying the to-be-displayed image 50 of photographer B and the divided region 48 displaying the to-be-displayed image 50 of photographer C as extracted regions, and enlarges the extracted regions in the dividing direction in accordance with the movement of the specified positions 54. Also, the controller 38 enlarges and displays the to-be-displayed images 50 displayed in the extracted regions in accordance with the enlargement of the extracted regions.

Figure 9A:
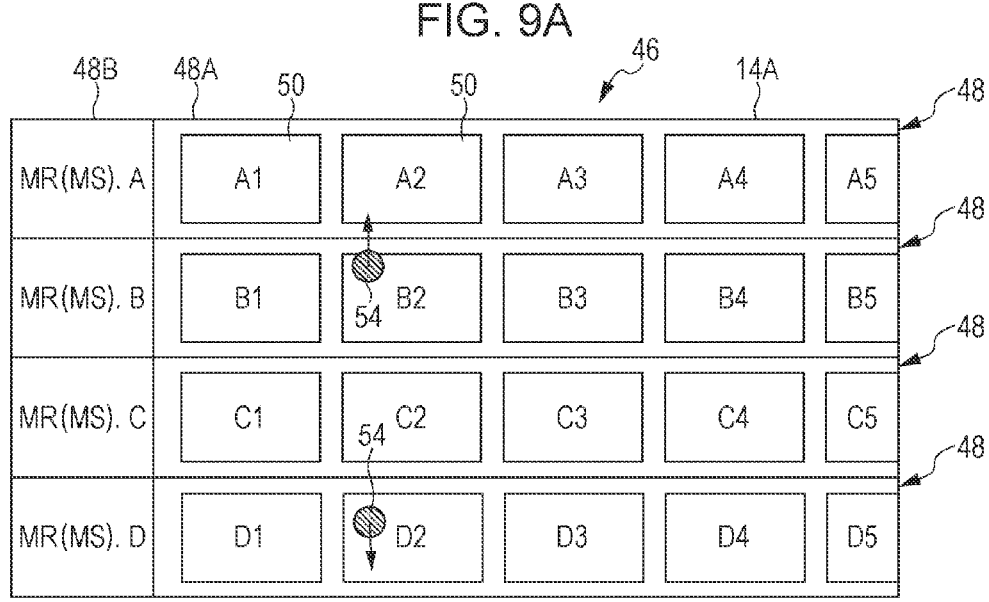
FIGS. 9A and 9B are diagrams provided for describing the state of an operation performed on the image list screen according to the first exemplary embodiment.
Figure 9B:
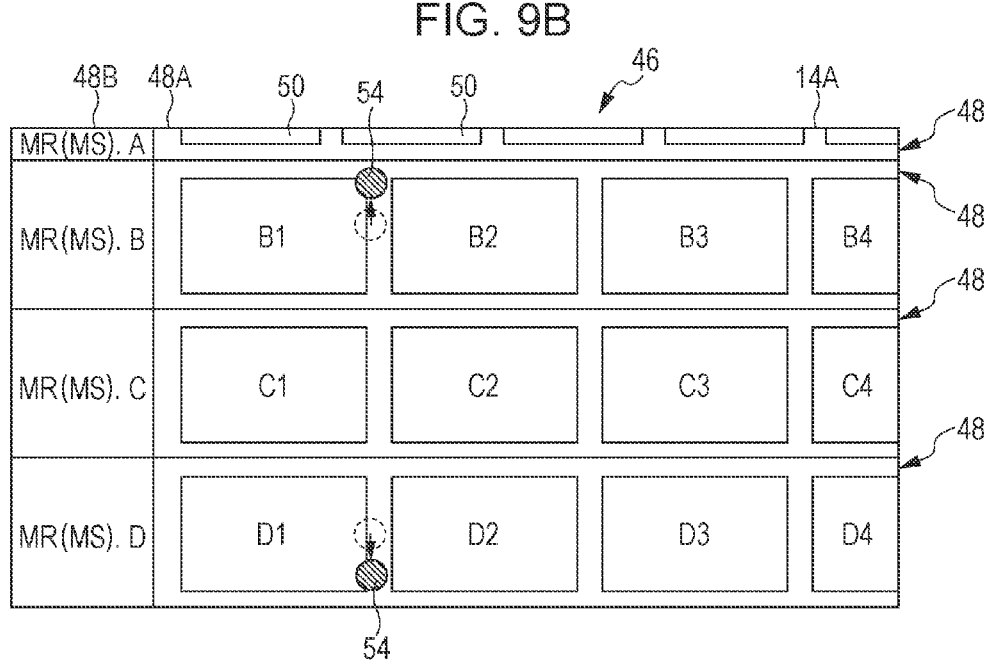

For example, as illustrated in FIG. 9A, it is assumed that one position in the divided region 48 displaying the to-be-displayed images 50 of photographer B and one position in a divided region 48 displaying the to-be-displayed images 50 of photographer D serve as specified positions 54. It is also assumed that these specified positions 54 move in a direction in which the specified positions 54 come apart from each other in the dividing direction. In this case, as illustrated in FIG. 9B, the controller 38 regards the divided regions 48 displaying the to-be-displayed images 50 of photographer B and photographer C, and the divided region 48 displaying the to-be-displayed images 50 of photographer C, which is sandwiched between these divided regions 48, as extracted regions. The controller 38 enlarges the extracted regions in the dividing direction in accordance with the movement of the specified positions 54. Also, the controller 38 enlarges and displays the to-be-displayed images 50 displayed in the extracted regions in accordance with the enlargement of the extracted regions.

In the examples so far, the examples in which the divided region(s) 48 and the to-be-displayed images 50 displayed in the divided region(s) 48 are enlarged have been described. However, the same applies to the case in which the size of the divided region(s) 48 and the to-be-displayed images 50 displayed in the divided region(s) 48 is reduced.

Figure 10A:
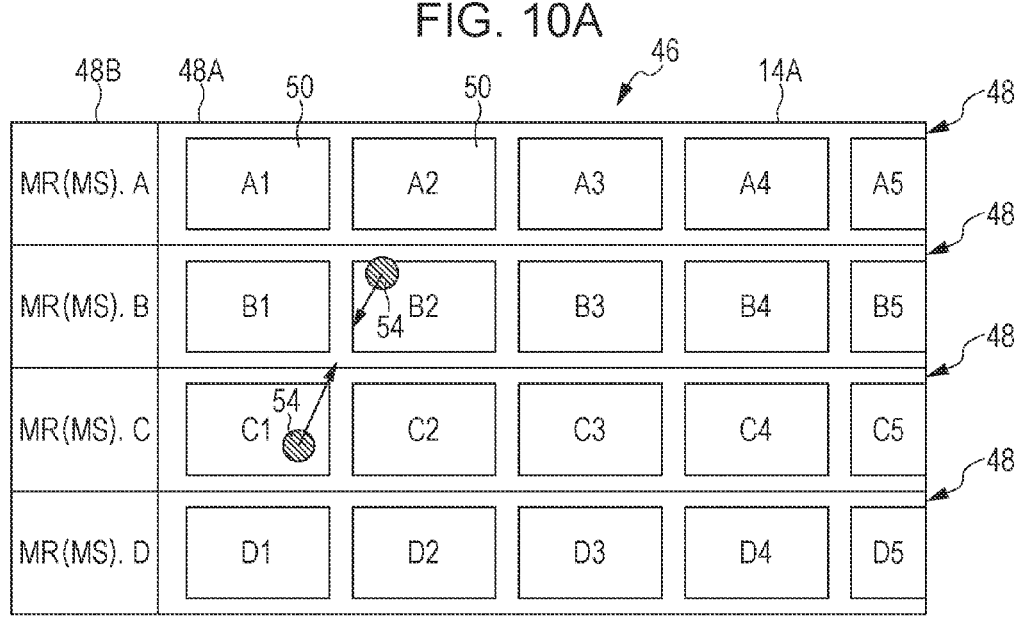
FIGS. 10A and 10B are diagrams provided for describing the state of an operation performed on the image list screen according to the first exemplary embodiment.
Figure 10B:
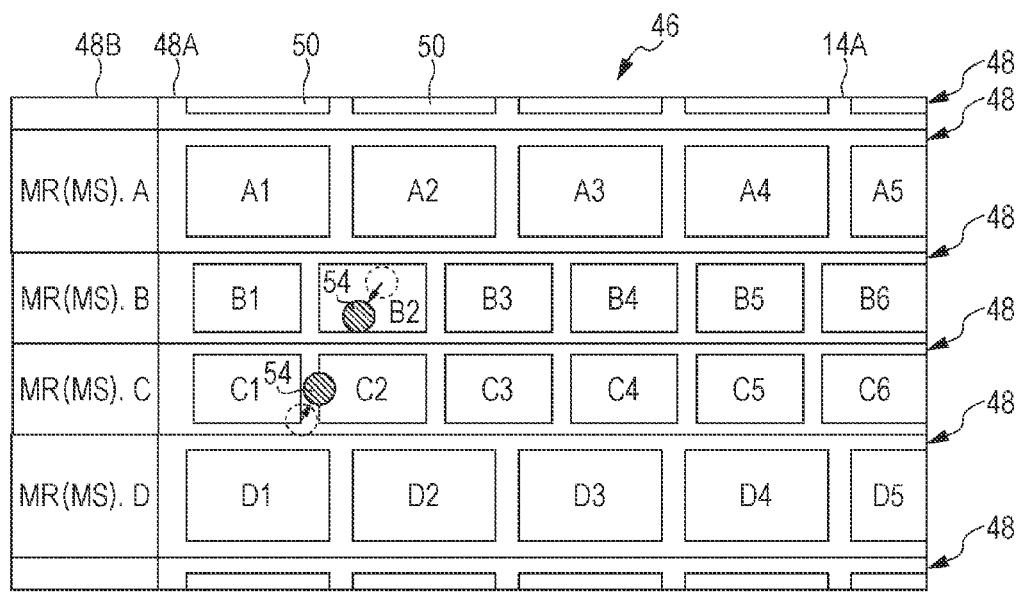

That is, for example, as illustrated in FIG. 10A, it is assumed that one position in the divided region 48 displaying the to-be-displayed images 50 of photographer B and one position in the divided region 48 displaying the to-be-displayed images 50 of photographer C serve as specified positions 54. It is also assumed that the specified positions 54 move in a direction in which the specified positions 54 come closer to each other in the dividing direction. In this case, as illustrated in FIG. 10B, the controller 38 regards the divided region 48 displaying the to-be-displayed images 50 of photographer B and the divided region 48 displaying the to-be-displayed images 50 of photographer C as extracted regions. The controller 38 reduces the size of the extracted regions in the dividing direction in accordance with the movement of the specified positions 54, and reduces the size of and displays the to-be-displayed images 50 displayed in the extracted regions in accordance with the size reduction of the extracted regions.

Figure 11A:
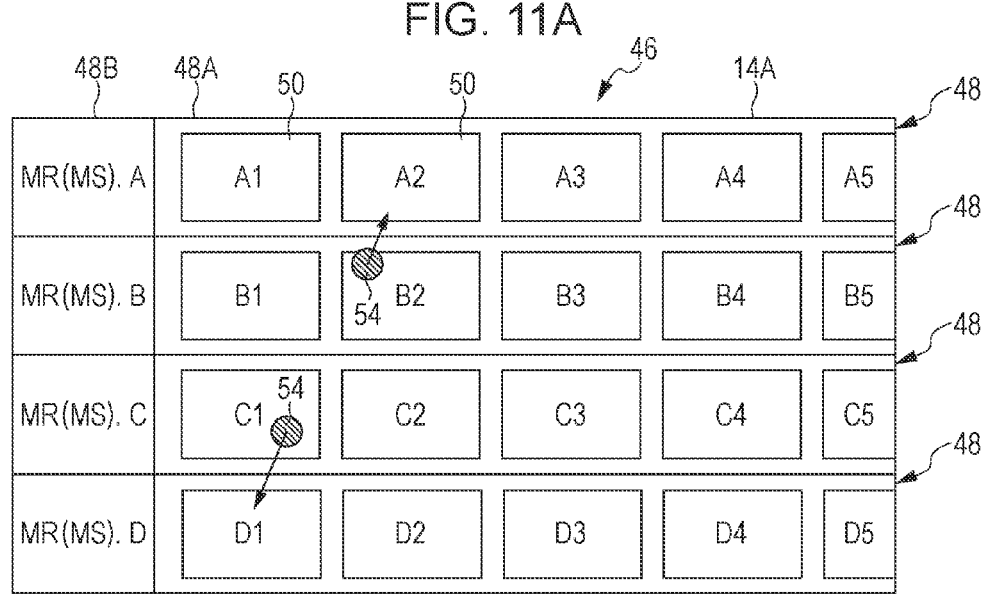
FIGS. 11A and 11B are diagrams provided for describing the state of an operation performed on the image list screen according to the first exemplary embodiment.
Figure 11B:
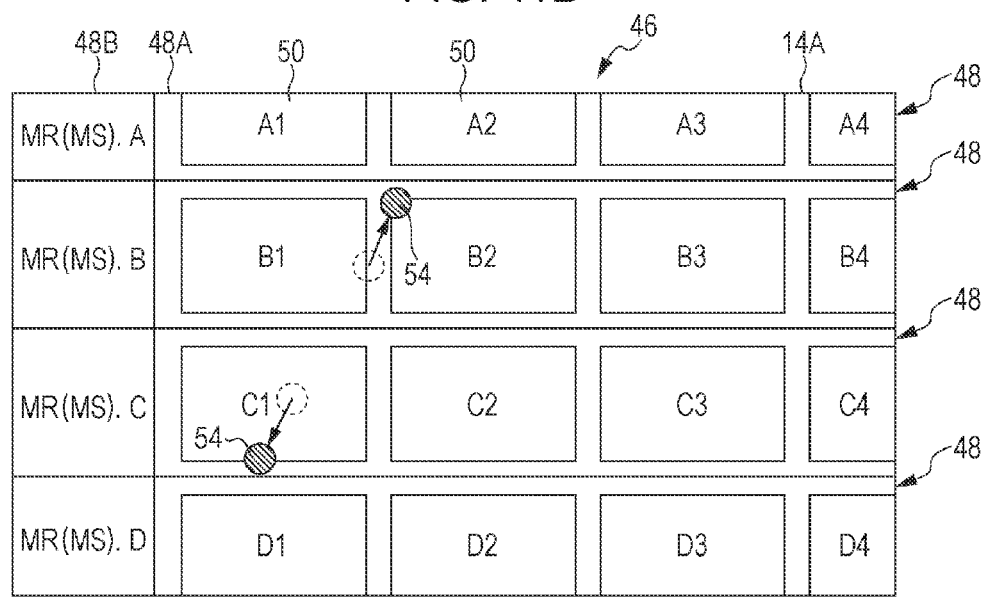

Also, the smartphone 10 may enlarge or reduce the size of all the divided regions 48 displayed in the display region of the display panel 14A. That is, for example, as illustrated in FIG. 11A, it is assumed that one position in the divided region 48 displaying the to-be-displayed images 50 of photographer B and one position in the divided region 48 displaying the to-be-displayed images 50 of photographer C serve as specified positions 54. It is also assumed that the specified positions 54 move in a direction in which the specified positions 54 come apart from each other in the dividing direction. In this case, as illustrated in FIG. 11B, the controller 38 regards all the divided regions 48 displayed in the display region as extracted regions. The controller 38 enlarges the extracted regions in the dividing direction in accordance with the movement of the specified positions 54, and enlarges and displays the to-be-displayed images 50 displayed in the extracted regions in accordance with the enlargement of the extracted regions.

Further, for example, as illustrated in FIG. 12A, it is assumed that one position in the divided region 48 displaying the to-be-displayed images 50 of photographer B and one position in the divided region 48 displaying the to-be-displayed images 50 of photographer C serve as specified positions 54. It is also assumed that the specified positions 54 move in a direction in which the specified positions 54 come closer to each other in the dividing direction. In this case, as illustrated in FIG. 12B, the controller 38 regards all the divided regions 48 displayed in the display region as extracted regions. The controller 38 reduces the size of the extracted regions in the dividing direction in accordance with the movement of the specified positions 54, and reduces the size of and displays the to-be-displayed images 50 displayed in the extracted regions in accordance with the size reduction of the extracted regions.

When specified positions 54 are apart from each other by a predetermined threshold (such as 3 cm) or more in the dividing direction, all the divided regions 48 displayed in the display region may be enlarged or reduced in size. It is preferable to determine the threshold by taking into consideration the distance between the fingertips of fingers of a user in a state in which the user positions multiple fingers used for specifying a divided region(s) 48. Alternatively, when the number of divided regions 48 sandwiched between multiple specified regions is greater than or equal to a predetermined threshold (such as two), all the divided regions 48 displayed in the display region may be enlarged or reduced in size.

When both a divided region 48 and a boundary region between multiple divided regions 48 are specified, the specified divided region 48, and a divided region 48 sandwiched between the specified divided region 48 and the specified boundary region may preferably serve as extracted regions.

Second Exemplary Embodiment

The smartphone 10 according to the above-described first exemplary embodiment performs control to enlarge or reduce the size of the extracted region(s) and the to-be-displayed images 50 displayed in the extracted region(s) when the specified positions 54 come apart from each other or closer to each other via the operation panel 14B. In contrast, the smartphone 10 according to a second exemplary embodiment performs control to enlarge or reduce the size of the extracted region(s) and the to-be-displayed images 50 displayed in the extracted region(s) when an operation of specifying again the specified positions 54 is performed via the operation panel 14B.

Since the configuration of the smartphone 10 according to the second exemplary embodiment is the same as or similar to that of the smartphone 10 according to the first exemplary embodiment, a description thereof will be omitted here.

Figure 13:
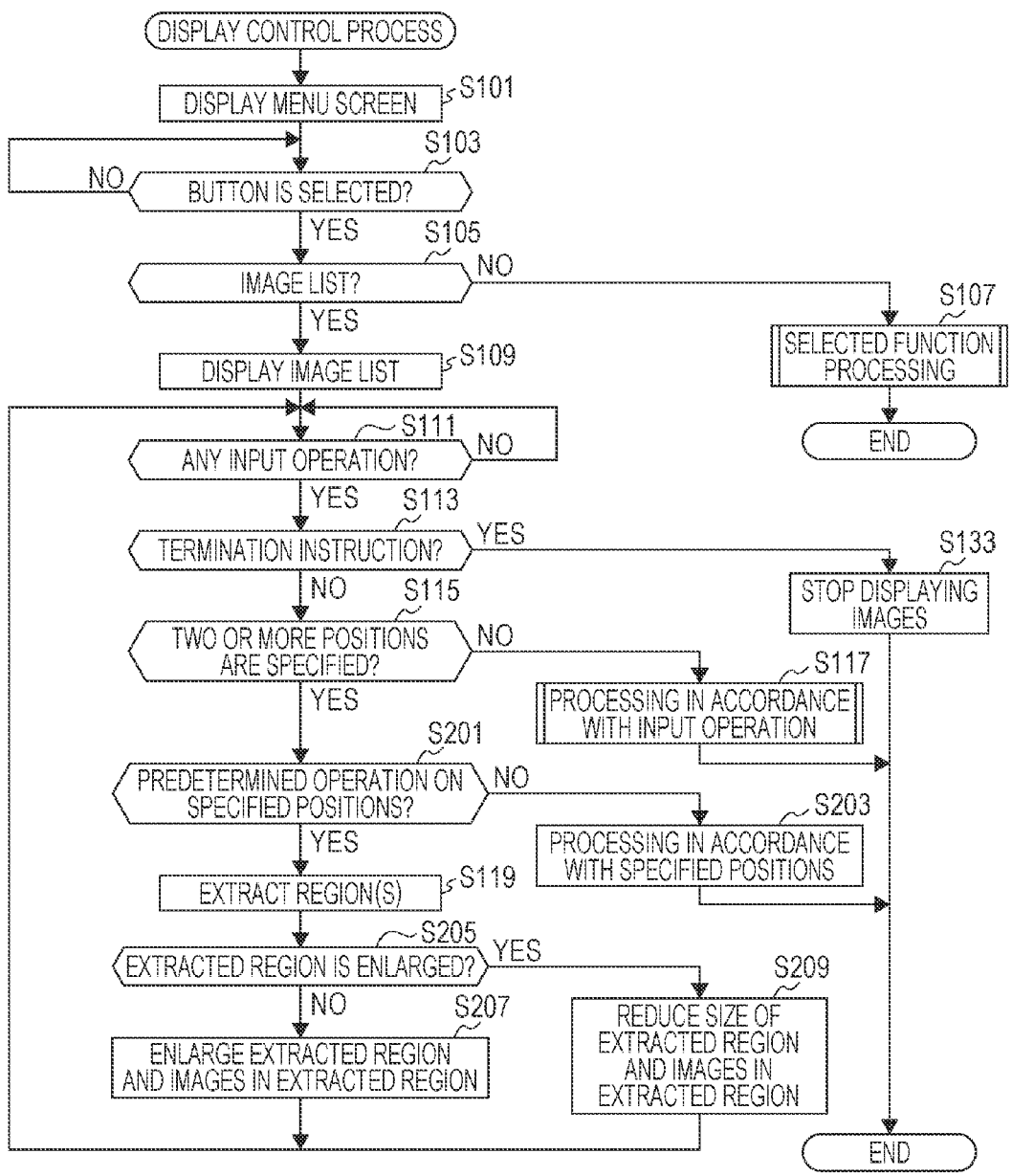
FIG. 13 is a flowchart illustrating the flow of a process of the display control processing program according to a second exemplary embodiment.

Next, referring to FIG. 13, the operation of the smartphone 10 according to the second exemplary embodiment will be described. FIG. 13 is a flowchart illustrating the flow of a process of the display control processing program according to the second exemplary embodiment, which is executed by the controller 38 of the smartphone 10 in response to an execution instruction input via the operation panel 14B or the operation unit 20. This program is stored in advance in a predetermined region of the internal memory 28A.

Firstly, in steps S101 to S117 and step S133, the same processing as that in steps S101 to S117 and step S133 of the first exemplary embodiment is performed.

When the determination in step S115 is affirmative, the process proceeds to step S201.

In step S201, it is determined whether a predetermined operation is performed on the specified positions 54. In the second exemplary embodiment, an operation of first releasing the fingertips from the specified positions 54 and then specifying again the specified positions 54 within a predetermined time (so-called "double tap operation") is applied as the predetermined operation. Note that the predetermined operation is not limited to a double tap operation, and an operation of moving the specified positions 54 in a predetermined direction, or an operation of specifying the same positions for a predetermined period (such as two seconds) or longer (so-called a "long press operation") may be applied as the predetermined operation.

When the determination in step S201 is negative, the process proceeds to step S203, executes processing in accordance with the specified positions 54, and terminates the display control processing program. The processing in accordance with the specified positions 54 in accordance with the second exemplary embodiment is, for example, processing performed with the display control processing program according to the first exemplary embodiment.

In contrast, when the determination in step S201 is affirmative, the process proceeds to step S119, and the same processing as that in step S119 of the first exemplary embodiment is performed, and the process proceeds to step S205.

In step S205, it is determined whether the extracted region has been enlarged in the dividing direction. At this time, the controller 38 determines that the extracted region has been enlarged when the extracted region is enlarged by processing in step S207 described later.

When the determination in step S205 is negative, the process proceeds to step S207, and the controller 38 performs control to enlarge the extracted region at a predetermined enlargement ratio (such as 2 times) in the dividing direction. Also, the controller 38 performs control to enlarge and display the to-be-displayed images 50 displayed in the extracted region, while maintaining the aspect ratio, and the process returns to step S111. In the second exemplary embodiment, the internal memory 28A stores in advance information indicating the predetermined enlargement ratio. The controller 38 obtains this information from the internal memory 28A, and enlarges the extracted region and the to-be-displayed images 50 at the enlargement ratio indicated by the obtained information.

In contrast, when the determination in step S205 is affirmative, the process proceeds to step S209, and the controller 38 performs control to reduce the size of the extracted region at a predetermined reduction ratio (such as ½ times) in the dividing direction. Also, the controller 38 performs control to reduce the size of and display the to-be-displayed images 50 displayed in the extracted region, while maintaining the aspect ratio, and the process returns to step S111. In the second exemplary embodiment, the internal memory 28A stores in advance information indicating the predetermined reduction ratio. The controller 38 obtains this information from the internal memory 28A, and reduces the size of the extracted region and the to-be-displayed images 50 at the reduction ratio indicated by the obtained information.

When there are multiple extracted regions, the processing in step S207 or S209 may be performed on all the extracted regions, or the processing in steps S205 to S209 may be performed in each of the extracted regions.

Figure 14A:
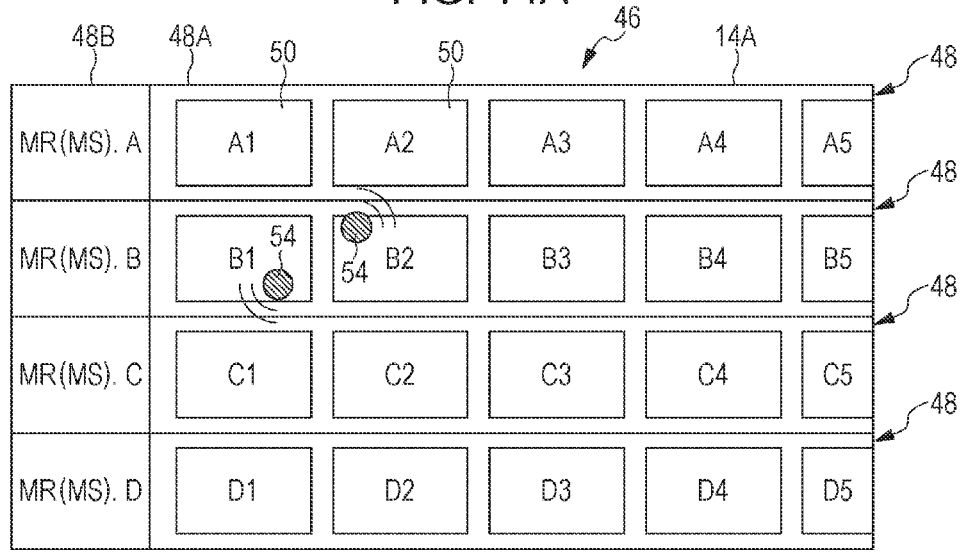
FIGS. 14A and 14B are diagrams provided for describing the state of an operation performed on the image list screen according to the second exemplary embodiment.
Figure 14B:
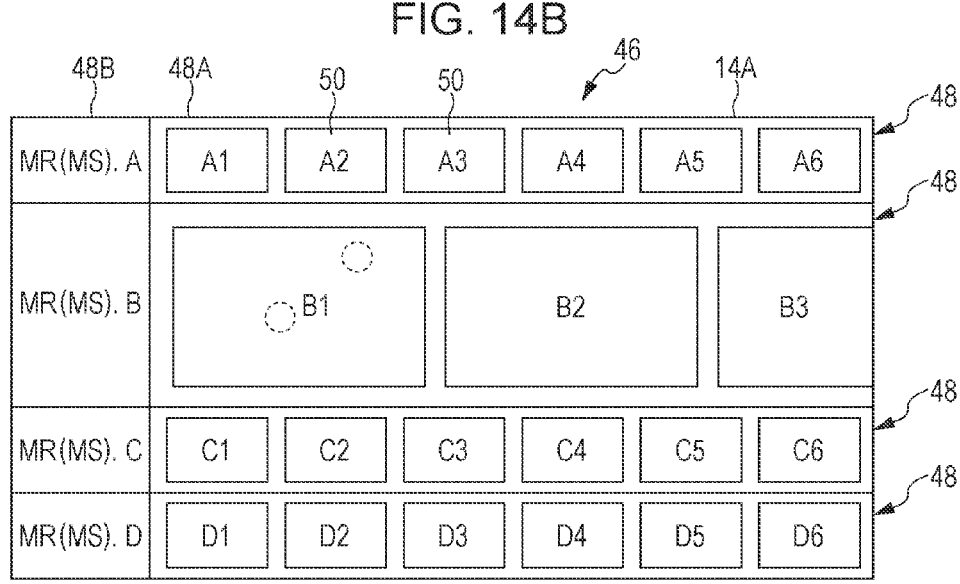

For example, as illustrated in FIG. 14A, it is assumed that the above-described double tapping is performed at two positions in the divided region 48 displaying the to-be-displayed images 50 of photographer B. In this case, as illustrated in FIG. 14B, the controller 38 regards the divided region 48 displaying the to-be-displayed images 50 of photographer B as an extracted region. Also, the controller 38 enlarges the extracted region at a predetermined enlargement ratio in the dividing direction, and the controller 38 enlarges and displays the to-be-displayed images 50 displayed in the extracted region in accordance with the enlargement of the extracted region.

As illustrated in FIG. 14B, it is assumed that the divided region 48 displaying the to-be-displayed images 50 of photographer B is enlarged, and that double tapping is performed at two positions in this divided region 48. In this case, the controller 38 regards the divided region 48 displaying the to-be-displayed images 50 of photographer B as an extracted region. Also, the controller 38 reduces the size of the extracted region at a predetermined reduction ratio in the dividing direction, and the controller 38 reduces the size of and displays the to-be-displayed images 50 displayed in the extracted region in accordance with the size reduction of the extracted region.

For example, as illustrated in FIG. 15A, it is assumed that double tapping is performed in each of the divided region 48 displaying the to-be-displayed images 50 of photographer B, the divided region 48 displaying the to-be-displayed images 50 of photographer C, and the divided region 48 displaying the to-be-displayed images 50 of photographer D. In this case, as illustrated in FIG. 15B, the controller 38 regards the divided region 48 displaying the to-be-displayed images 50 of photographer B, the divided region 48 displaying the to-be-displayed images 50 of photographer C, and the divided region 48 displaying the to-be-displayed images 50 of photographer D as extracted regions. Also, the controller 38 enlarges the extracted regions at a predetermined enlargement ratio in the dividing direction, and enlarges and displays the to-be-displayed images 50 displayed in the extracted regions in accordance with the enlargement of the extracted regions.

Alternatively, it is assumed that double tapping is performed in the divided region 48 displaying the to-be-displayed images 50 of photographer B and the divided region 48 displaying the to-be-displayed images 50 of photographer D. In this case, the controller 38 may regard the divided region 48 displaying the to-be-displayed images 50 of photographer B and the divided region 48 displaying the to-be-displayed images 50 of photographer D, and the divided region 48 displaying the to-be-displayed images 50 of photographer C, which is sandwiched between these divided regions 48, as extracted regions.

Third Exemplary Embodiment

The smartphone 10 according to the above-described first exemplary embodiment performs control to enlarge or reduce the size of the extracted region(s) and the to-be-displayed images 50 displayed in the extracted region(s) when the specified positions 54 in the image display region(s) 48A come apart from each other or closer to each other via the operation panel 14B. In contrast, the smartphone 10 according to a third exemplary embodiment performs the above-described enlargement or size reduction control when multiple specified positions 54 in the attribute display region(s) 48B come apart from each other or closer to each other via the operation panel 14B.

Since the configuration of the smartphone 10 according to the third exemplary embodiment is the same as or similar to that of the smartphone 10 according to the first and second exemplary embodiments, a description thereof will be omitted here.

Figure 16:
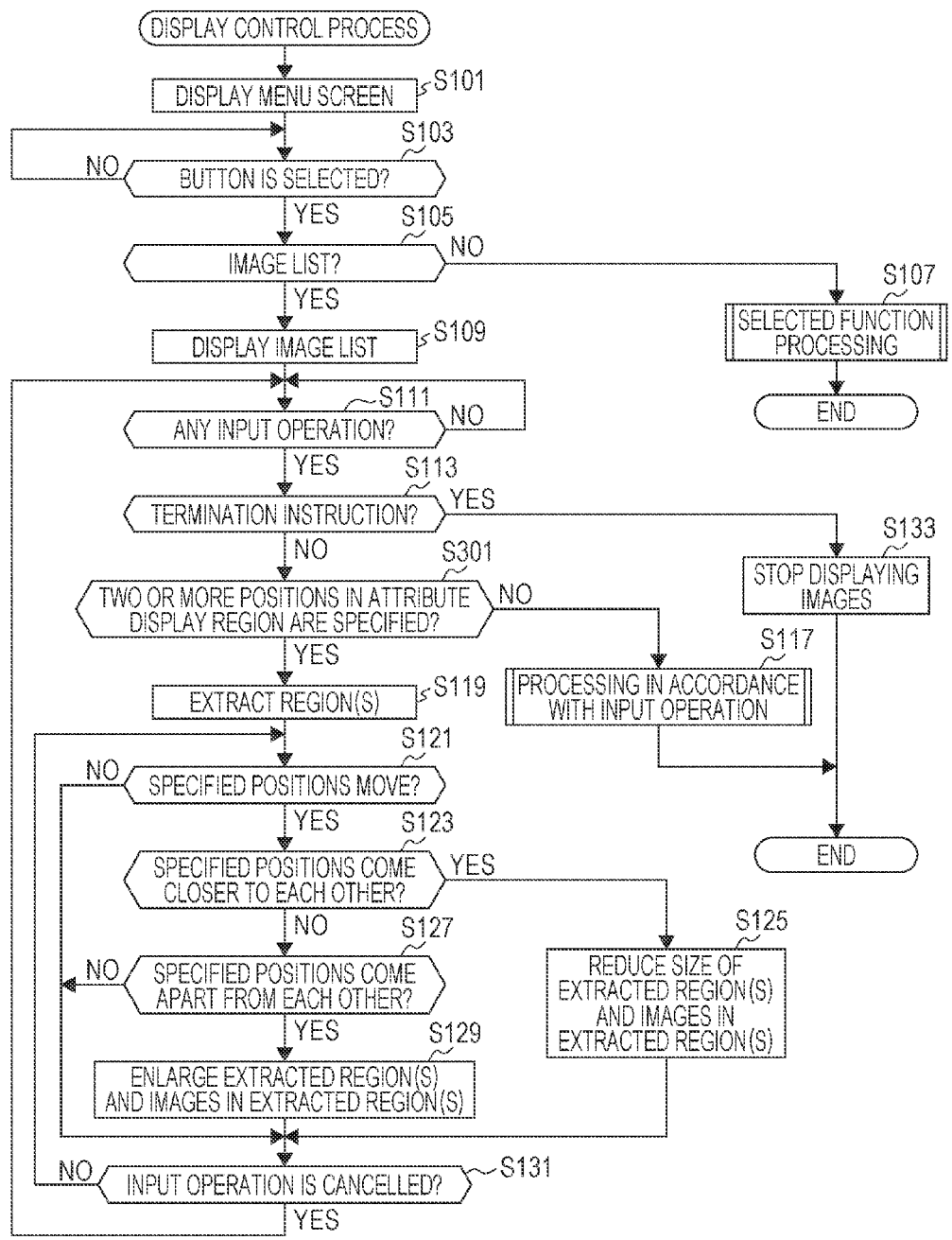
FIG. 16 is a flowchart illustrating the flow of a process of the display control processing program according to a third exemplary embodiment.

Next, referring to FIG. 16, the operation of the smartphone 10 according to the third exemplary embodiment will be described. FIG. 16 is a flowchart illustrating the flow of a process of the display control processing program executed by the controller 38 of the smartphone 10 in response to an execution instruction input via the operation panel 14B or the operation unit 20. This program is stored in advance in a predetermined region of the internal memory 28A.

Firstly, in steps S101 to S113 and step S133, the same processing as that in steps S101 to S113 and step S133 of the first exemplary embodiment is performed.

In step S301, it is determined whether the input operation is an operation of specifying two or more positions in the attribute display region(s) 48B. At this time, it is determined that the input operation is an operation of specifying two or more positions in the attribute display region 48B when a user touches two or more positions in the attribute display region 48B of any of the divided regions 48 via the operation panel 14B.

When the determination in step S301 is negative, the process proceeds to step S117, and performs the same processing as that in step S117 of the first exemplary embodiment.

In contrast, when the determination in step S301 is affirmative, the process proceeds to step S119. In steps S119 to S133, the same processing as that in steps S119 to S133 of the first exemplary embodiment is performed.

Figure 17A:
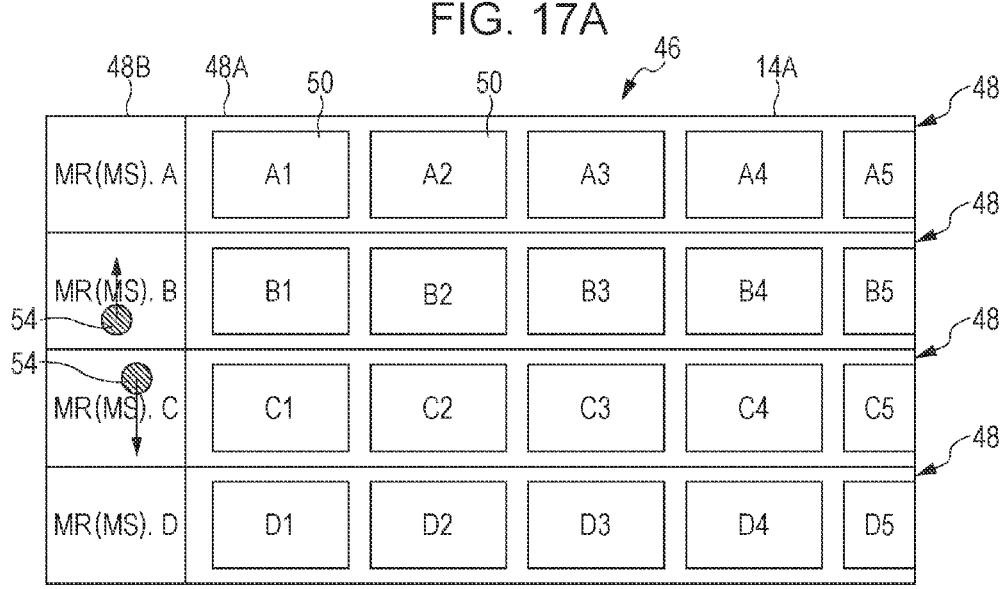
FIGS. 17A and 17B are diagrams provided for describing the state of an operation performed on the image list screen according to the third exemplary embodiment.
Figure 17B:
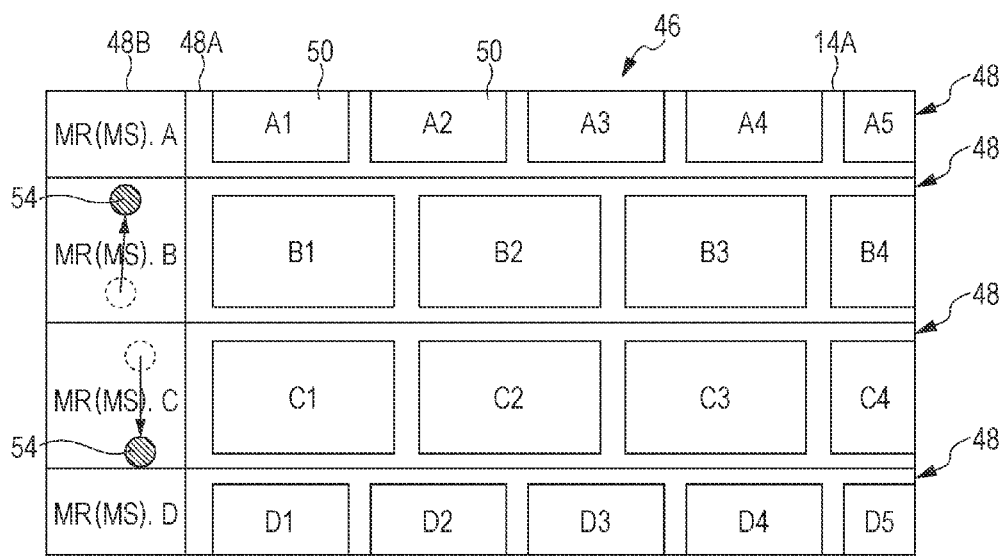

For example, as illustrated in FIG. 17A, it is assumed that one position in the attribute display region 48B of the divided region 48 displaying the to-be-displayed images 50 of photographer B and one position in the attribute display region 48B of the divided region 48 displaying the to-be-displayed images 50 of photographer C are specified. It is assumed that these specified positions 54 move in a direction in which the specified positions 54 come apart from each other in the dividing direction. In this case, as illustrated in FIG. 17B, the controller 38 regards the divided region 48 displaying the to-be-displayed images 50 of photographer B and the divided region 48 displaying the to-be-displayed images 50 of photographer C as extracted regions. Also, the controller 38 enlarges the extracted regions in the dividing direction in accordance with the movement of the specified positions 54, and enlarges and displays the to-be-displayed images 50 displayed in the extracted regions in accordance with the enlargement of the extracted regions.

Fourth Exemplary Embodiment

The smartphone 10 according to the third exemplary embodiment performs control to enlarge or reduce the size of the extracted region(s) and the to-be-displayed images 50 displayed in the extracted regions when the specified positions 54 in the attribute display region(s) 48B come apart from each other or closer to each other via the operation panel 14B. In contrast, the smartphone 10 according to a fourth exemplary embodiment combines the extracted regions to obtain one combined region when the specified positions 54 in the attribute display regions 48B come closer to each other via the operation panel 14B. The smartphone 10 according to the fourth exemplary embodiment performs control to enlarge and display the to-be-displayed images 50, displayed in the individual extracted regions, in the combined region.

Since the configuration of the smartphone 10 according to the fourth exemplary embodiment is the same as or similar to that of the smartphone 10 according to the first to third exemplary embodiments, a description thereof will be omitted here.

Figure 18:
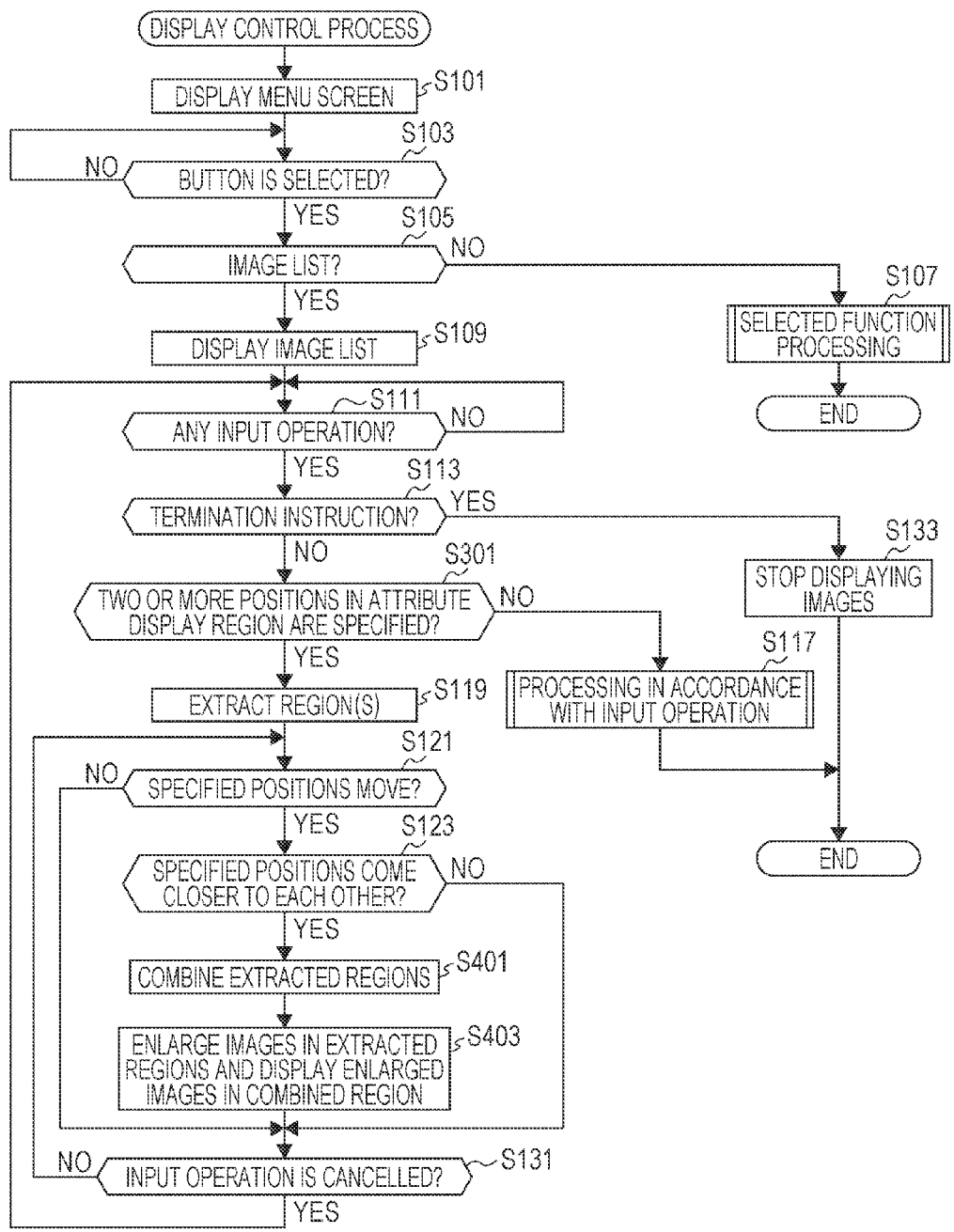
FIG. 18 is a flowchart illustrating the flow of a process of the display control processing program according to a fourth exemplary embodiment.

Next, referring to FIG. 18, the operation of the smartphone 10 according to the fourth exemplary embodiment will be described. FIG. 18 is a flowchart illustrating the flow of a process of the display control processing program executed by the controller 38 of the smartphone 10 in response to an execution instruction input via the operation panel 14B or the operation unit 20. This program is stored in advance in a predetermined region of the internal memory 28A.

Firstly, in steps S101 to S113, the same processing as that in steps S101 to S113 of the first exemplary embodiment is performed. In step S301, the same processing as that in step S301 of the third exemplary embodiment is performed, and the process proceeds to step S119. Further, in steps S119 to S123, the same processing as that in steps S119 to S123 of the first exemplary embodiment is performed. When the determination in step S123 is negative, the process proceeds to step S131 described later. In contrast, when the determination in step S123 is affirmative, the process proceeds to step S401.

In step S401, the controller 38 combines the extracted regions to obtain one divided region (hereinafter referred to as a "combined region") 48C. At this time, the controller 38 obtains the size of the combined region 48C by adding the sizes of the pre-combined extracted regions.

In step S403, the controller 38 performs control to enlarge and display the to-be-displayed images 50, displayed in the extracted regions, in the combined region 48C. At this time, the controller 38 enlarges each of the to-be-displayed images 50 in accordance with the size of the combined region 48C.

Figure 19A:
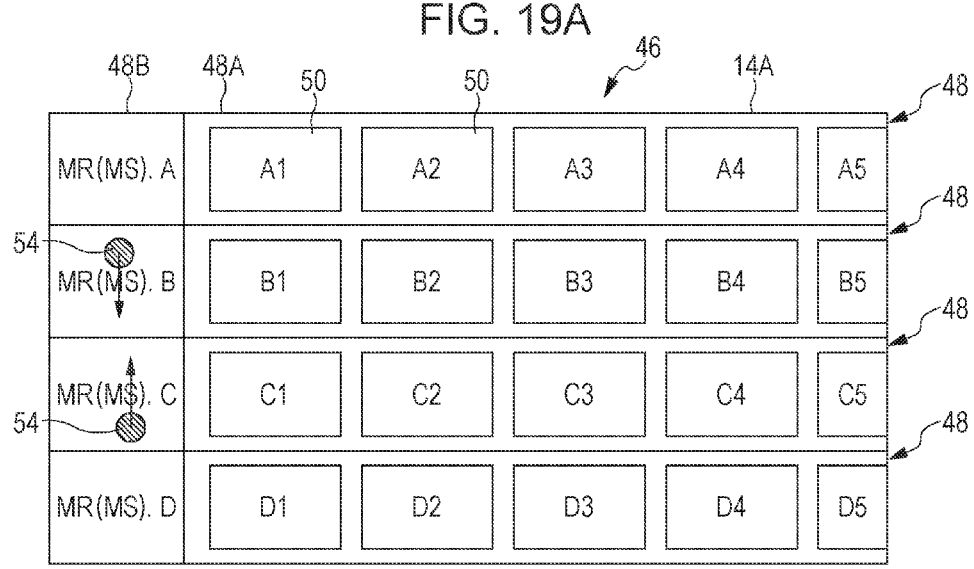
FIGS. 19A and 19B are diagrams provided for describing the state of an operation performed on the image list screen according to the fourth exemplary embodiment.
Figure 19B:
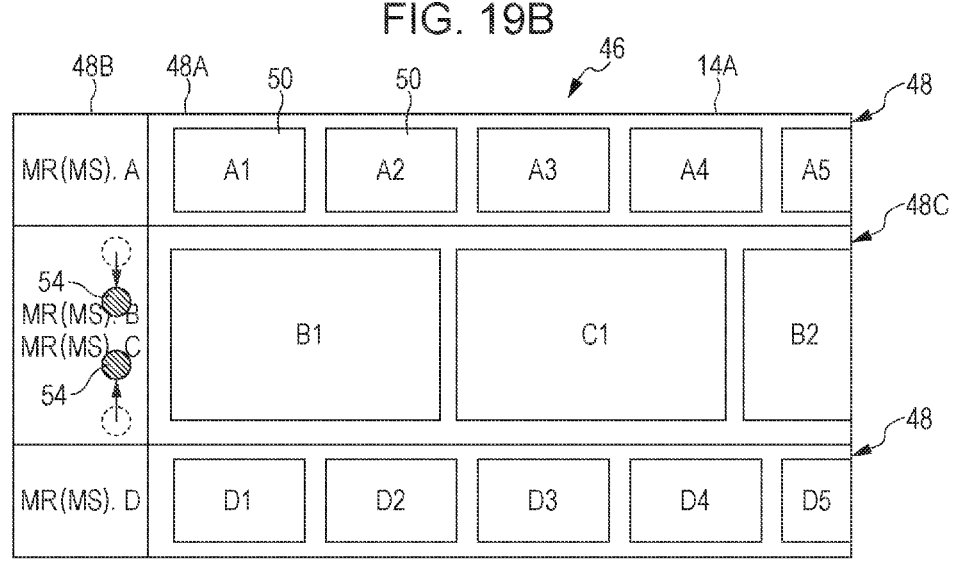

For example, as illustrated in FIG. 19A, it is assumed that one position in the attribute display region 48B of the divided region 48 displaying the to-be-displayed images 50 of photographer B and one position in the attribute display region 48B of the divided region 48 displaying the to-be-displayed images 50 of photographer C are specified. It is also assumed that these specified positions 54 come closer to each other in the dividing direction. In this case, as illustrated in FIG. 19B, the controller 38 combines the divided region 48 displaying the to-be-displayed images 50 of photographer B and the divided region 48 displaying the to-be-displayed images 50 of photographer C to obtain one combined region 48C. At this time, as described above, the combined region 48C is a region with a size obtained by adding the divided region 48 displaying the to-be-displayed images 50 of photographer B and the divided region 48 displaying the to-be-displayed images 50 of photographer C. Also, the controller 38 enlarges the to-be-displayed images 50 of photographer B and the to-be-displayed images 50 of photographer C in accordance with the size of the combined region 48C, and displays the enlarged to-be-displayed images 50 in the combined region 48C.

In step S131, the same processing as that in step S131 of the first exemplary embodiment is performed.

Note that, when a predetermined operation is performed in the combined region 48C via the operation panel 14B, the combined region 48C may be de-combined, and the divided regions 48 combined as the combined region 48C may be individually displayed. In this case, the controller 38 performs control to display the pre-combined divided regions 48 in the display region of the display panel 14A. The predetermined operation is, for example, the above-described double tap operation or the above-described long press operation performed in the combined region 48C.

Fifth Exemplary Embodiment

The smartphone 10 according to the fourth exemplary embodiment performs control to combine the extracted regions to obtain one combined region 48C and to display the combined region 48C when the specified positions 54 in the attribute display regions 48B come closer to each other via the operation panel 14B. In contrast, the smartphone 10 according to a fifth exemplary embodiment performs control to, when a specified position 54 in the attribute display region 48B moves to another divided region 48 via the operation panel 14B, combine the extracted regions 48 before and after the movement to obtain one combined region 48C, and display the combined region 48C.

Since the configuration of the smartphone 10 according to the fifth exemplary embodiment is the same as or similar to that of the smartphone 10 according to the first to fourth exemplary embodiments, a description thereof will be omitted here.

Figure 20:
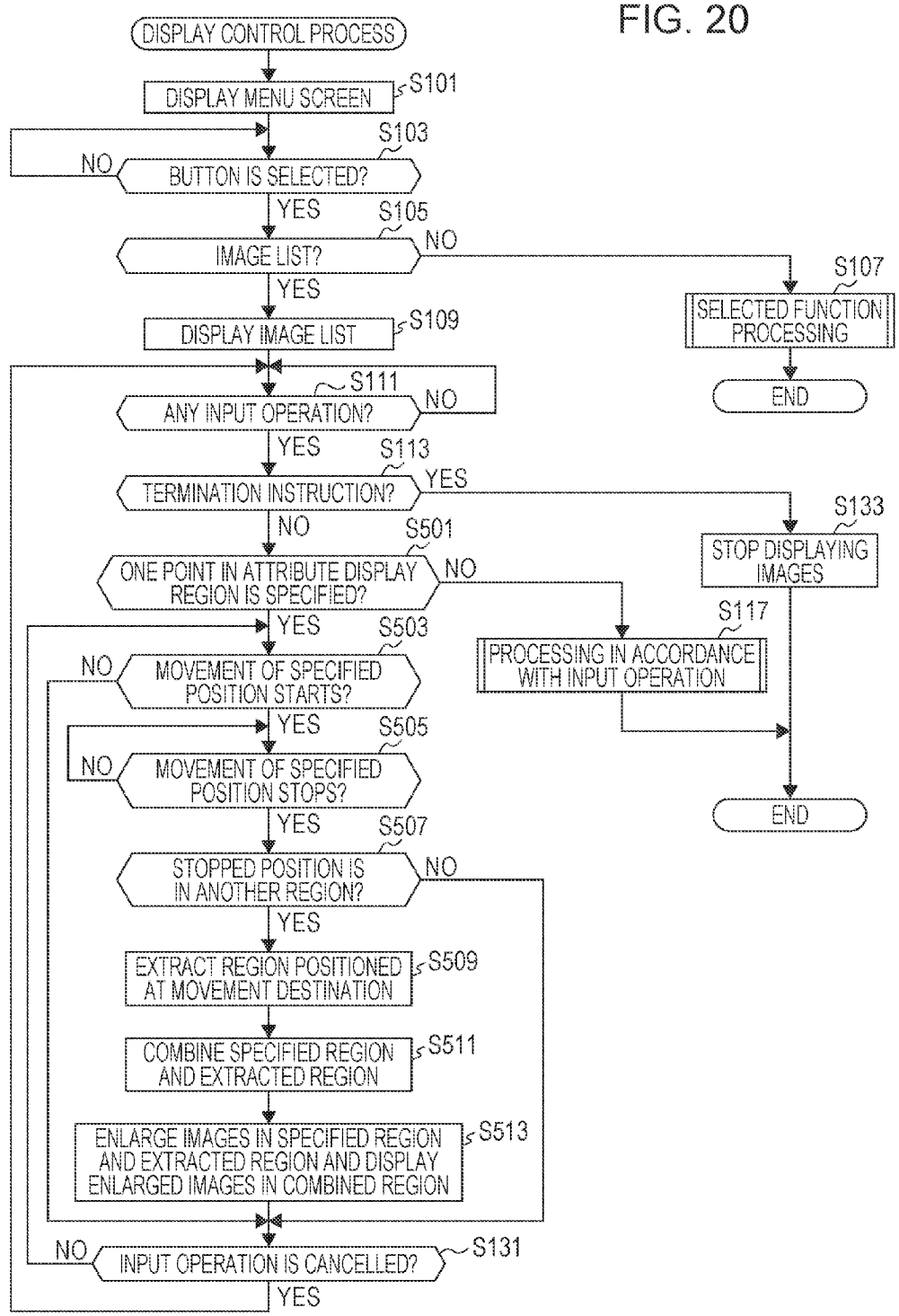
FIG. 20 is a flowchart illustrating the flow of a process of the display control processing program according to a fifth exemplary embodiment.

Next, referring to FIG. 20, the operation of the smartphone 10 according to the fifth exemplary embodiment will be described. FIG. 20 is a flowchart illustrating the flow of a process of the display control processing program executed by the controller 38 of the smartphone 10 in response to an execution instruction input via the operation panel 14B or the operation unit 20. This program is stored in advance in a predetermined region of the internal memory 28A.

Firstly, in steps S101 to S113, S117, and S133, the same processing as that in steps S101 to S113, S117, and S133 of the first exemplary embodiment is performed. When the determination in step S113 is negative, the process proceeds to step S501.

In step S501, it is determined whether the input operation is an operation of specifying one point in the attribute display region 48B. At this time, the controller 38 determines that the input operation is an operation of specifying one point in the attribute display region 48B when one position in the attribute display region 48B of any of the divided regions 48 is touched via the operation panel 14B.

When the determination in step S501 is negative, the process proceeds to step S117, and the same processing as that in step S117 of the first exemplary embodiment is performed. In contrast, when the determination in step S501 is affirmative, the process proceeds to step S503.

In step S503, it is determined whether the movement of the specified position 54 in the dividing direction is started. At this time, the controller 38 determines that the movement of the specified position 54 in the dividing direction is started when the specified position 54 moves by a predetermined distance (such as 3 mm) or more in the dividing direction.

When the determination in step S503 is negative, the process proceeds to step S131. In contrast, when the determination in step S503 is affirmative, the process proceeds to step S505.

In step S505, the controller 38 enters standby until the movement of the specified position 54 in the dividing direction stops. In step S507, it is determined whether the stopped position of the specified position 54 is in a divided region 48 (different divided region 48) different from the divided region 48 (hereinafter referred to as the "specified region") displayed at the specified position 54. In the fifth exemplary embodiment, it is determined that the stopped position of the specified position 54 is in a different divided region 48 different from the specified region when the stopped position is in the attribute display region 48B of the different divided region 48. However, the determination method is not limited to this case. Alternatively, it may be determined that the stopped position is in a different divided region 48 different from the specified region when the stopped position is in the image display region 48A of the different divided region 48.

When the determination in step S507 is negative, the process proceeds to step S131. In contrast, when the determination in step S507 is affirmative, the process proceeds to step S509.

In step S509, the controller 38 extracts, as an extracted region, the divided region 48 displayed at the stopped position of the specified position 54. Alternatively, when another divided region 48 is displayed between the divided region 48 displayed at the specified position 54 and the extracted region, this other divided region 48 may also serve as an extracted region.

In step S511, the controller 38 combines the specified region and the extracted region to obtain one combined region 48C. In step S513, the controller 38 performs control to enlarge the to-be-displayed images 50 displayed in the specified region and the extracted region, and to display the enlarged to-be-displayed images 50 in the combined region 48C.

Figure 21A:
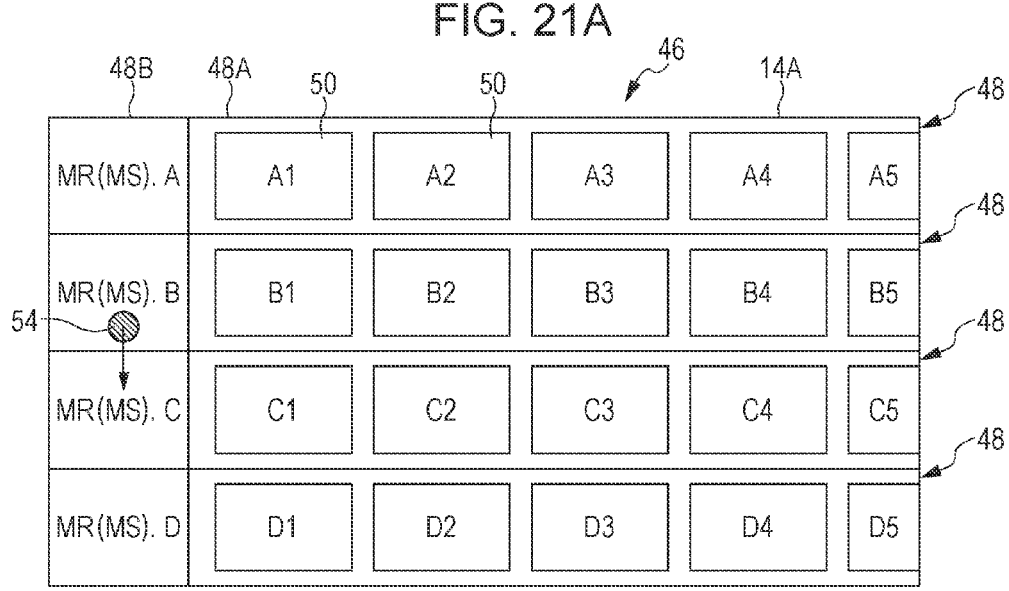
FIGS. 21A and 21B are diagrams provided for describing the state of an operation performed on the image list screen according to the fifth exemplary embodiment.
Figure 21B:
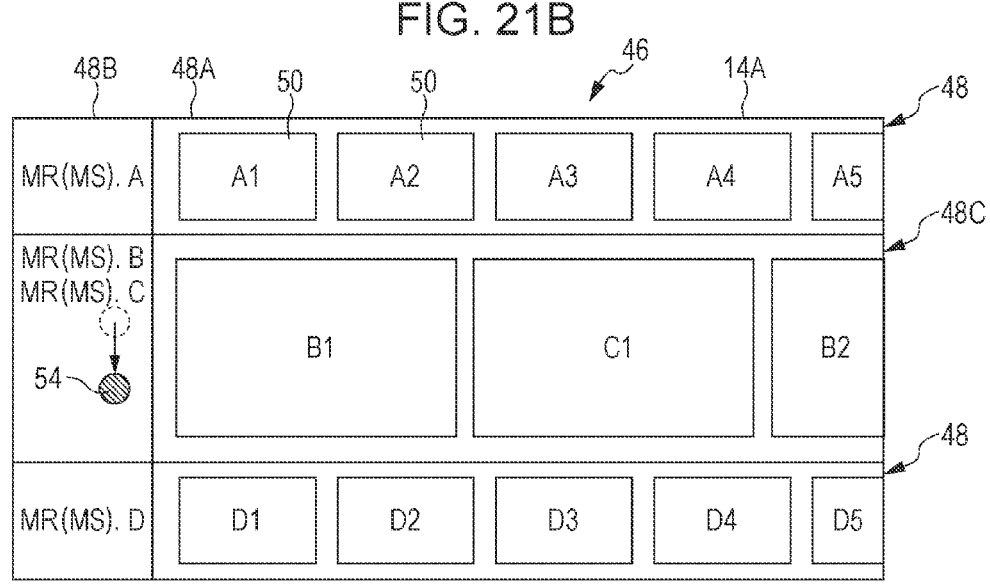

For example, as illustrated in FIG. 21A, it is assumed that one point in the attribute display region 48B of the divided region 48 displaying the to-be-displayed images 50 of photographer B is specified, and that the specified position 54 moves to the attribute display region 48B of the divided region 48 displaying the to-be-displayed images 50 of photographer C. In this case, as illustrated in FIG. 21B, the controller 38 combines the divided region 48 displaying the to-be-displayed images 50 of photographer B and the divided region 48 displaying the to-be-displayed images 50 of photographer C to obtain one combined region 48C. Note that the combined region 48C is a region obtained by adding the divided region 48 displaying the to-be-displayed images 50 of photographer B and the divided region 48 displaying the to-be-displayed images 50 of photographer C. Also, the controller 38 enlarges the to-be-displayed images 50 of photographer B and the to-be-displayed images 50 of photographer C in accordance with the size of the combined region 48C, and displays the enlarged to-be-displayed images 50 in the combined region 48C.

In step S131, the same processing as that in step S131 of the first exemplary embodiment is performed.

Note that, when a predetermined operation is performed in the combined region 48C via the operation panel 14B, the combined region 48C may be de-combined, and the divided regions 48 combined as the combined region 48C may be individually displayed. In this case, the controller 38 performs control to display the pre-combined divided regions 48 in the display region of the display panel 14A. The predetermined operation is, for example, the above-described double tap operation or the above-described long press operation performed in the combined region 48C.

Sixth Exemplary Embodiment

The smartphone 10 according to the first to fifth exemplary embodiments performs control to enlarge or reduce the size of the extracted region(s) when the divided region(s) 48 is/are specified and a predetermined operation is performed via the operation panel 14B. In contrast, the smartphone 10 according to a sixth exemplary embodiment performs control to, when a boundary region between divided regions 48 is specified via the operation panel 14B, enlarge or reduce the size of a divided region adjacent to the boundary region.

Since the configuration of the smartphone 10 according to the sixth exemplary embodiment is the same as or similar to that of the smartphone 10 according to the first to fifth exemplary embodiments, a description thereof will be omitted here.

Figure 22:
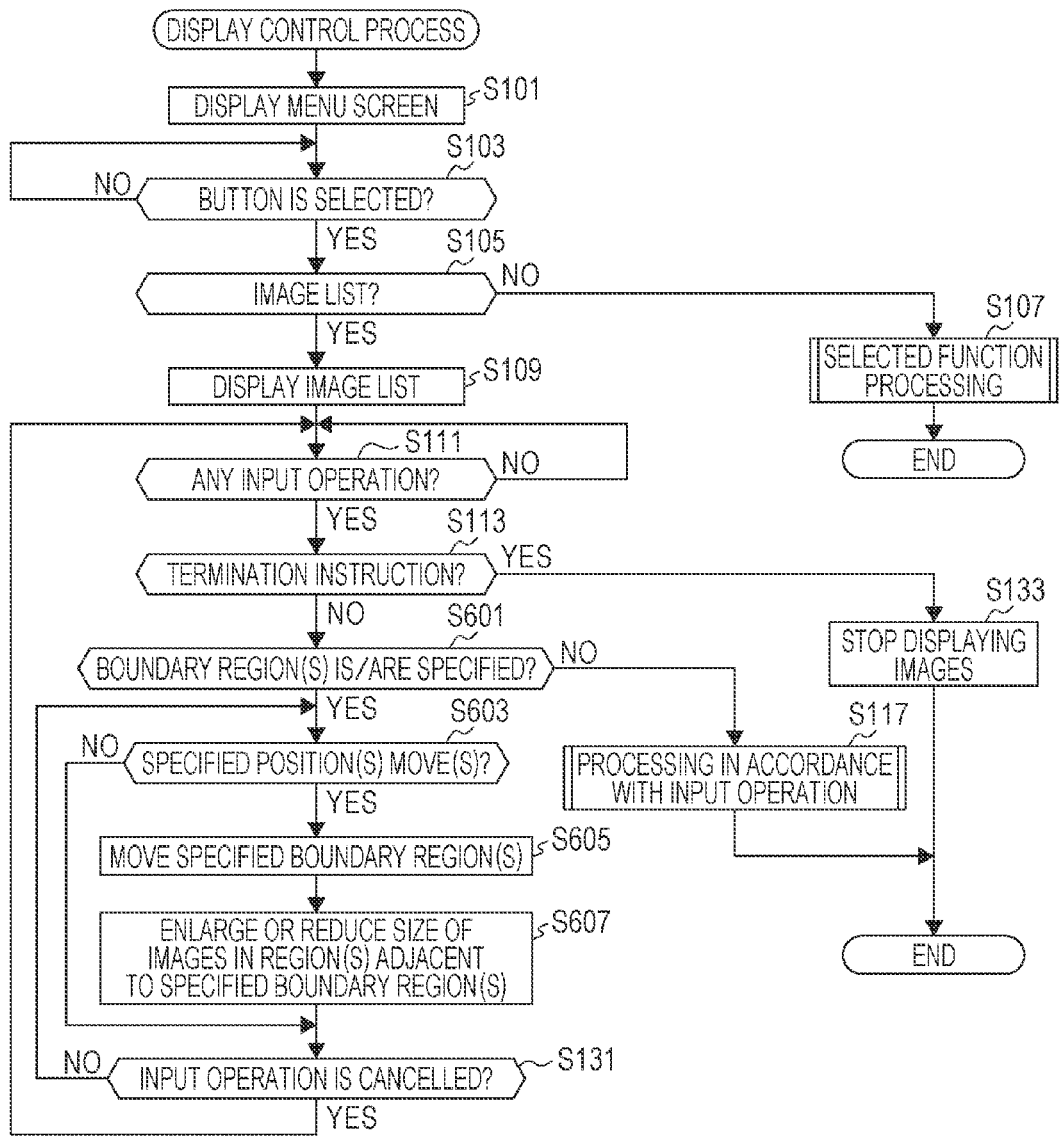
FIG. 22 is a flowchart illustrating the flow of a process of the display control processing program according to a sixth exemplary embodiment.

Next, referring to FIG. 22, the operation of the smartphone 10 according to the sixth exemplary embodiment will be described. FIG. 22 is a flowchart illustrating the flow of a process of the display control processing program executed by the controller 38 of the smartphone 10 in response to an execution instruction input via the operation panel 14B or the operation unit 20. This program is stored in advance in a predetermined region of the internal memory 28A.

Firstly, in steps S101 to S113, and S133, the same processing as that in steps S101 to S113, and S133 of the first exemplary embodiment is performed. When the determination in step S113 is negative, the process proceeds to step S601.

In step S601, it is determined whether the input operation is an operation of specifying one or more points in a boundary region(s) between divided regions 48. At this time, the controller 38 determines that the input operation is an operation of specifying one or more points in a boundary region(s) between divided regions 48 when one or more positions within a predetermined distance (such as 1 mm) from the boundary line between divided regions 48 are touched via the operation panel 14B.

When the determination in step S601 is negative, the process proceeds to step S117, and the same processing as that in step S117 of the first exemplary embodiment is performed. In contrast, when the determination in step S601 is affirmative, the process proceeds to step S603.

In step S603, it is determined whether the specified position(s) 54 move(s) in the dividing direction. At this time, the controller 38 determines that the specified position(s) 54 move(s) in the dividing direction when the specified position(s) 54 move(s) by a predetermined distance (such as 3 mm) or more in the dividing direction.

When the determination in step S603 is negative, the process proceeds to step S131. In contrast, when the determination in step S603 is affirmative, the process proceeds to step S605.

In step S605, a boundary region(s) closest to the specified position(s) 54 (hereinafter referred to as a "specified boundary region(s)") is/are moved in the dividing direction in accordance with the movement of the specified position(s) 54 in the dividing direction. By moving the specified boundary region(s), the controller 38 performs control to enlarge or reduce the size of a divided region(s) 48 adjacent to the specified boundary region(s).

In step S607, the controller 38 performs control to enlarge or reduce the size of the to-be-displayed images 50 displayed in the divided region(s) 48 adjacent to the specified boundary region(s), in accordance with the enlargement or size reduction of the divided region(s) 48, while maintaining the aspect ratio.

Figure 23A:
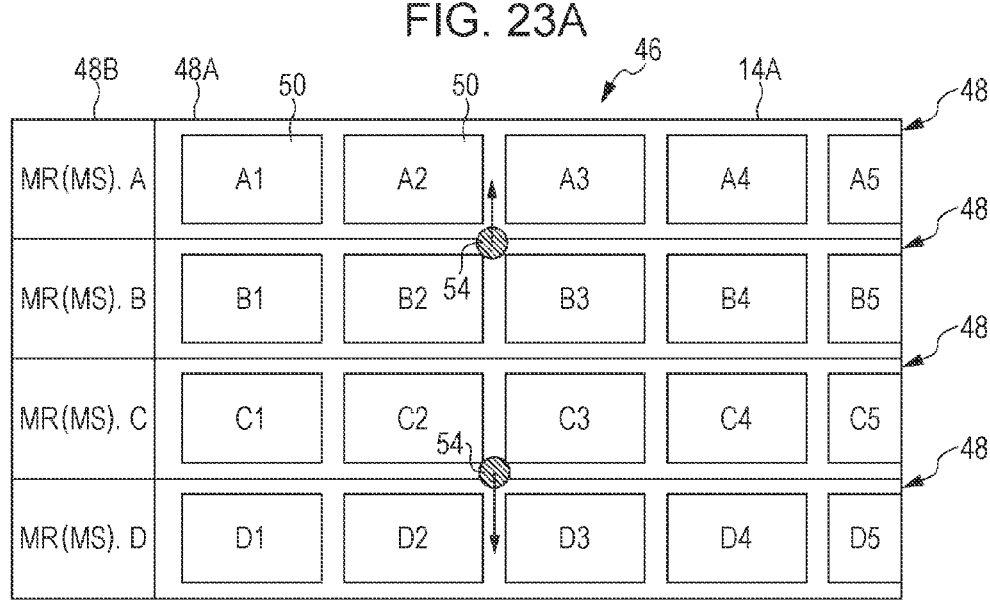
FIGS. 23A and 23B are diagrams provided for describing the state of an operation performed on the image list screen according to the sixth exemplary embodiment.
Figure 23B:
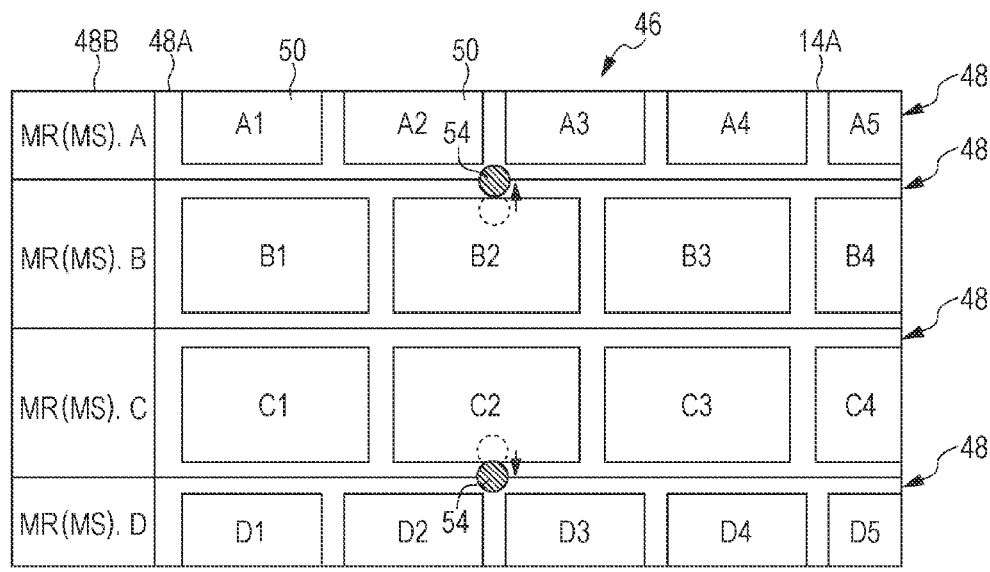

For example, as illustrated in FIG. 23A, it is assumed that a boundary region AB between the divided region 48 displaying the to-be-displayed images 50 of photographer A and the divided region 48 displaying the to-be-displayed images 50 of photographer B is specified via the operation panel 14B. It is also assumed that a boundary region CD between the divided region 48 displaying the to-be-displayed images 50 of photographer C and the divided region 48 displaying the to-be-displayed images 50 of photographer D is specified via the operation panel 14B. Further, it is assumed that the specified positions 54 move in a direction in which the specified positions 54 come apart from each other in the dividing direction. In this case, as illustrated in FIG. 23B, the controller 38 moves the boundary region AB and the boundary region CD in a direction in which the boundary regions AB and CD come apart from each other in the dividing direction, in accordance with the movement of the specified positions 54. Accordingly, the controller 38 enlarges the divided region 48 displaying the to-be-displayed images 50 of photographer B and the divided region 48 displaying the to-be-displayed images 50 of photographer C, which exist between the boundary region AB and the boundary region CD. At this time, the to-be-displayed images 50 of photographer B are enlarged and displayed in accordance with the enlargement of the divided region 48 displaying the to-be-displayed images 50 of photographer B. Also, the to-be-displayed images 50 of photographer C are enlarged and displayed in accordance with the enlargement of the divided region 48 displaying the to-be-displayed images 50 of photographer C.

When there are three or more divided regions 48 between two specified boundary regions, the controller 38 performs control to enlarge or reduce the size of each of the three or more divided regions 48, while keeping the three or more divided regions 48 at the same size. When the three or more divided regions 48 have different sizes, the controller 38 performs control to enlarge or reduce the size of each of the three or more divided regions 48 without changing the size ratio of the three or more divided regions 48.

In the sixth exemplary embodiment, when there are two or more specified boundary regions, the size of divided regions 48 that are not sandwiched between the specified boundary regions is not changed. However, the sixth exemplary embodiment is not limited to this case. That is, when a divided region 48 sandwiched between the specified boundary regions is enlarged, divided regions 48 that are not sandwiched between the specified boundary regions may be reduced in size at a reduction ratio that increases as the enlargement ratio of the above-described enlargement increases. Also, when a divided region 48 sandwiched between the specified boundary regions is reduced in size, divided regions 48 that are not sandwiched between the specified boundary regions may be enlarged at an enlargement ratio that increases as the reduction ratio of the above-described size reduction increases.

In step S131, the same processing as that in step S131 of the first exemplary embodiment is performed.

In the sixth exemplary embodiment, it is assumed that, after control is performed to enlarge or reduce the size of an extracted region(s) and the to-be-displayed images 50 displayed in the extracted region(s) by moving a boundary region(s), a predetermined operation such as the above-described double tapping is performed in the moved boundary region(s). In this case, it is preferable to perform control to restore the boundary region(s) to a state prior to the movement and to restore the extracted region(s) and the to-be-displayed images 50 displayed in the extracted region(s) to a state prior to the movement.

Seventh Exemplary Embodiment

The smartphone 10 according to the first exemplary embodiment performs control to enlarge or reduce the size of the extracted region(s) when the divided region(s) 48 is/are specified and a predetermined operation is performed via the operation panel 14B. In contrast, the smartphone 10 according to a seventh exemplary embodiment performs control to, when a predetermined operation is performed via the operation panel 14B, enlarge or reduce the size of a divided region 48 serving as a control target specified in advance to be enlarged or reduced in size via the operation panel 14B.

Since the configuration of the smartphone 10 according to the seventh exemplary embodiment is the same as or similar to that of the smartphone 10 according to the first to sixth exemplary embodiments, a description thereof will be omitted here.

Figure 24:
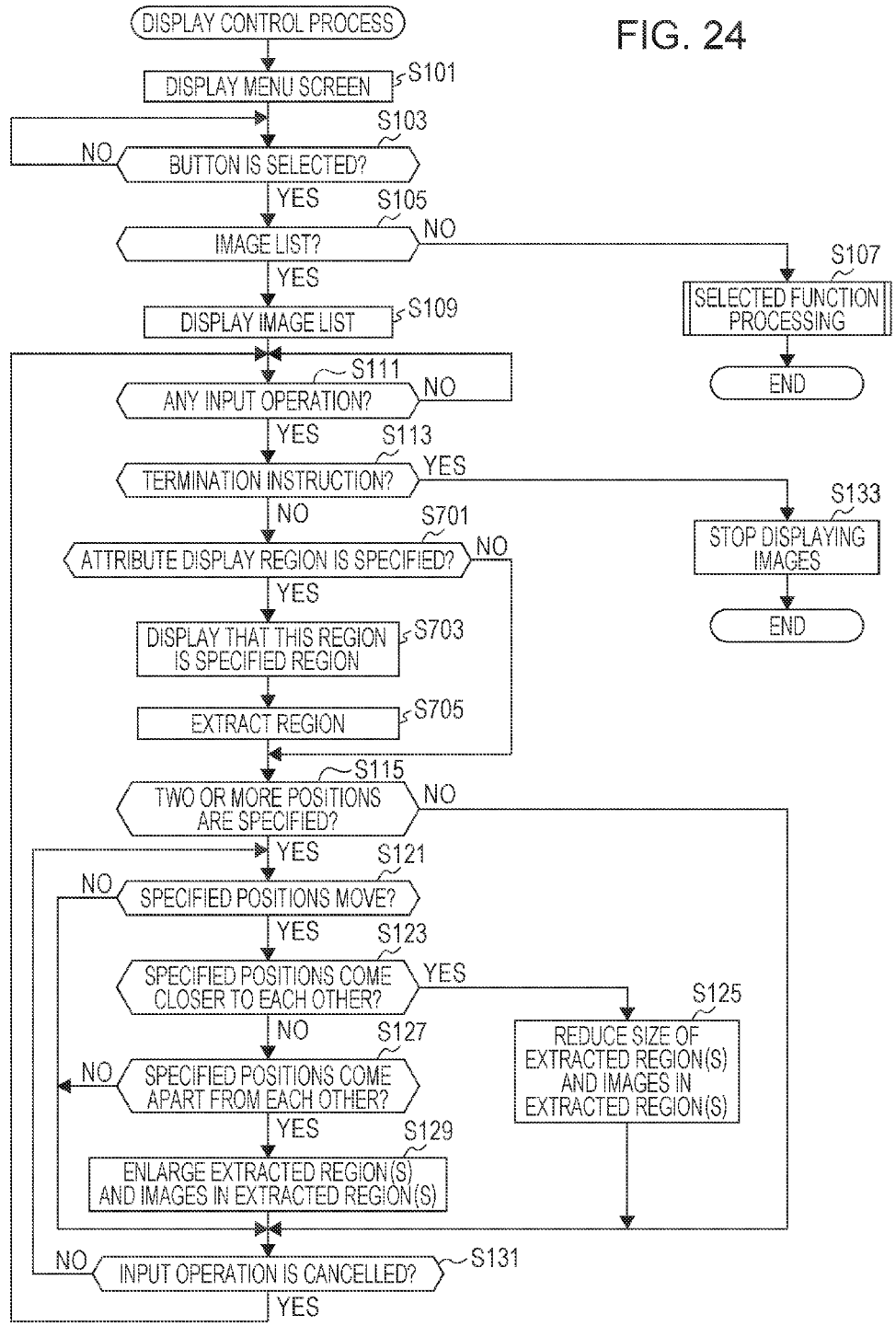
FIG. 24 is a flowchart illustrating the flow of a process of the display control processing program according to a seventh exemplary embodiment.

Next, referring to FIG. 24, the operation of the smartphone 10 according to the seventh exemplary embodiment will be described. FIG. 24 is a flowchart illustrating the flow of a process of the display control processing program executed by the controller 38 of the smartphone 10 in response to an execution instruction input via the operation panel 14B or the operation unit 20. This program is stored in advance in a predetermined region of the internal memory 28A.

Firstly, in steps S101 to S113, and S133, the same processing as that in steps S101 to S113, and S133 of the first exemplary embodiment is performed. When the determination in step S113 is negative, the process proceeds to step S701.

In step S701, it is determined whether the input operation is an operation of specifying the attribute display region 48B of each divided region 48. At this time, the controller 38 determines that the input operation is an operation of specifying the attribute display region 48B of each divided region 48 when one or more positions in the attribute display region 48B of any of the divided regions 48 is touched via the operation panel 14B.

When the determination in step S701 is negative, the process proceeds to step S115. In contrast, when the determination in step S701 is affirmative, the process proceeds to step S703.

In step S703, the controller 38 performs control to display, at a divided region 48 displayed at the specified position 54, a marking indicating that the divided region is a specified divided region 48.

Figure 25A:
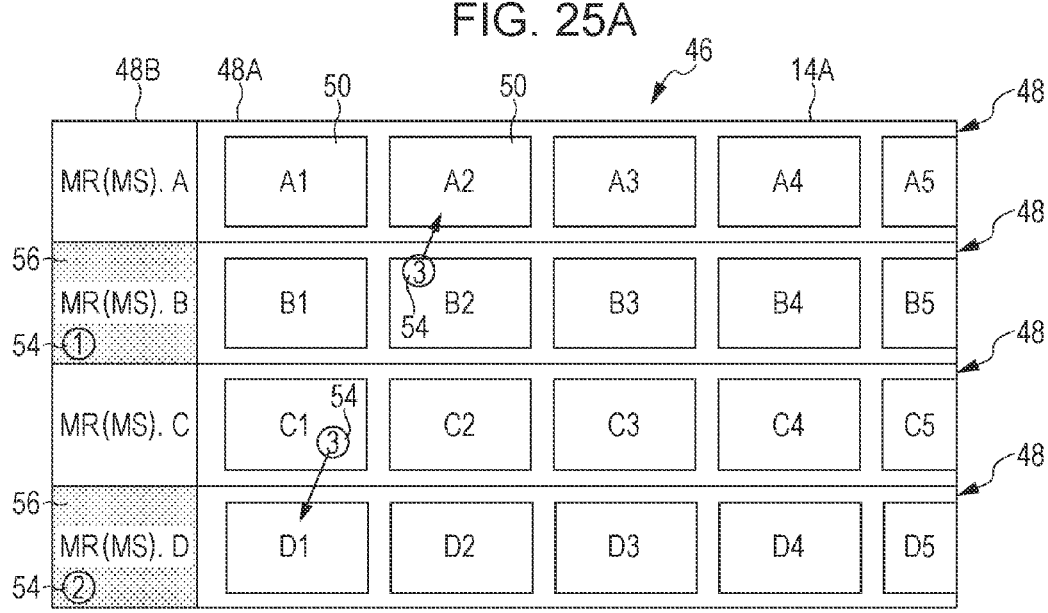
FIGS. 25A and 25B are diagrams provided for describing the state of an operation performed on the image list screen according to the seventh exemplary embodiment.

For example, as illustrated in FIG. 25A, when the attribute display region 48B of the divided region 48 of photographer B is specified, the background color of the attribute display region 48B of the divided region 48 of photographer B is changed to a color denoting that the divided region 48 is a region specified as a control target.

When the divided region 48 of the specified attribute display region 48B has already been specified as a control target, it is preferable to exclude this divided region 48 from being a control target, and to change the background color of the attribute display region 48B of this divided region back to the original color.

In step S705, the divided region 48 displayed as being a control target is extracted, and the extracted divided region 48 serves as the above-described extracted region.

In step S115, the same processing as that in step S115 of the first exemplary embodiment is performed. When the determination in step S115 is negative, the process proceeds to step S131. In contrast, when the determination is affirmative, the process proceeds to step S121.

In steps S121 to S131, the same processing as that in steps S121 to S131 of the first exemplary embodiment is performed.

Figure 25B:
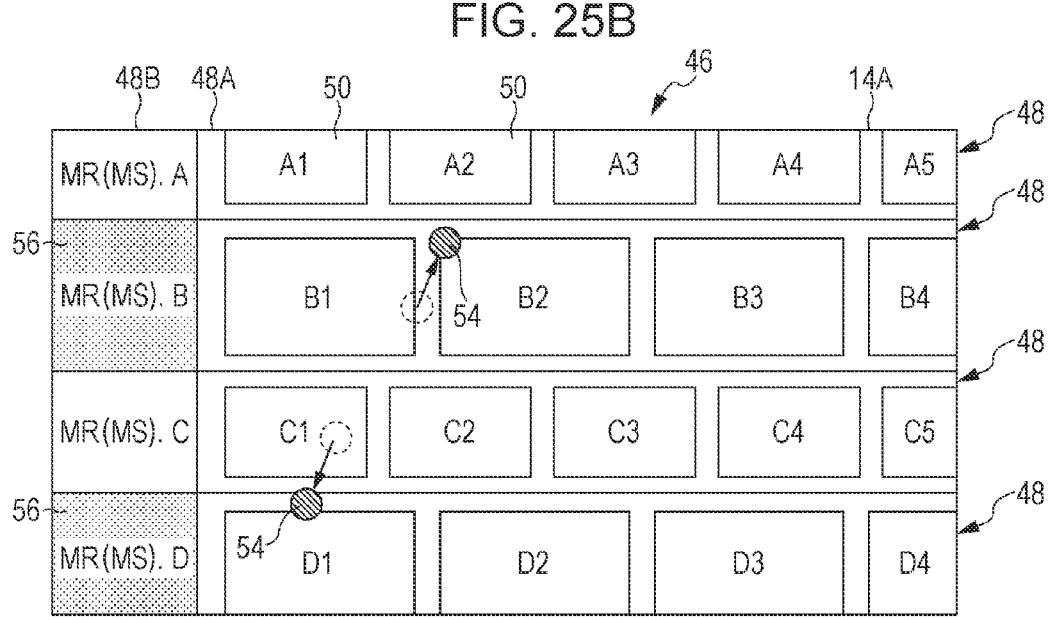

For example, as illustrated in FIG. 25A, it is assumed that the attribute display region 48B of the divided region 48 displaying the to-be-displayed images 50 of photographer B is specified, and similarly the attribute display region 48B of the divided region 48 displaying the to-be-displayed images 50 of photographer D is specified. In this case, the controller 38 regards the divided region 48 displaying the to-be-displayed images 50 of photographer B and the divided region 48 displaying the to-be-displayed images 50 of photographer D as extracted regions. Also, as illustrated in FIG. 25B, it is assumed that two positions are specified in the image display regions 48A, and the specified positions 54 move in a direction in which the specified positions 54 come apart from each other in the dividing direction. In this case, the controller 38 enlarges the divided region 48 displaying the to-be-displayed images 50 of photographer B and the divided region 48 displaying the to-be-displayed images 50 of photographer D.

In the seventh exemplary embodiment, a divided region serving as a control target is specified, and the divided region 48 specified as a control target serves as an extracted region. However, the seventh exemplary embodiment is not limited to this case. That is, a divided region 48 not serving as a control target may be specified, and this divided region 48 specified as not serving as a control target may be excluded from being a control target.

Figure 26A:
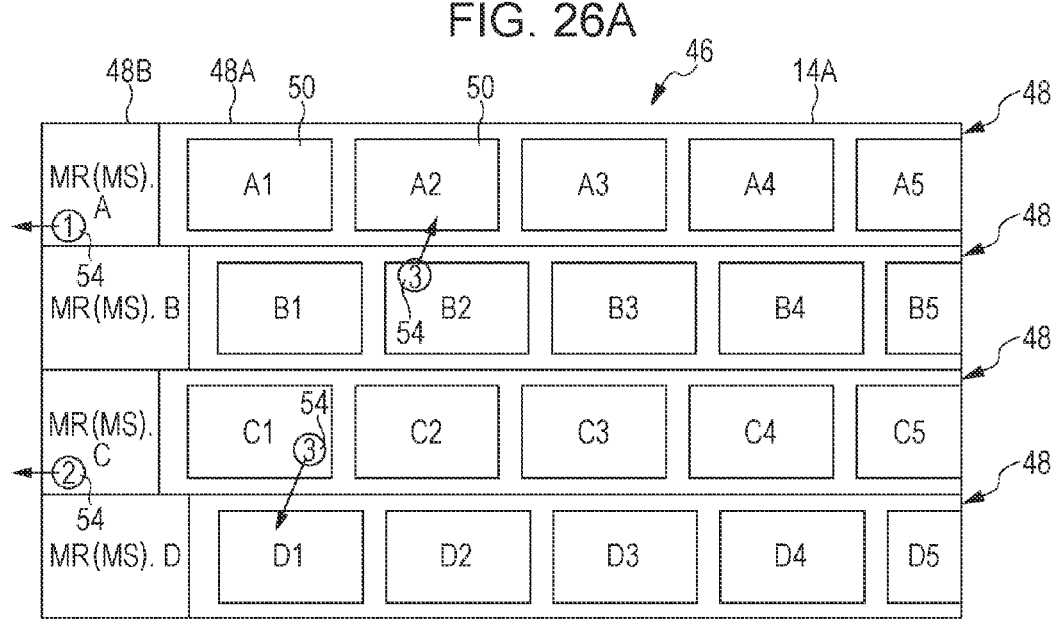
FIGS. 26A and 26B are diagrams provided for describing the state of an operation performed on the image list screen according to the seventh exemplary embodiment.
Figure 26B:
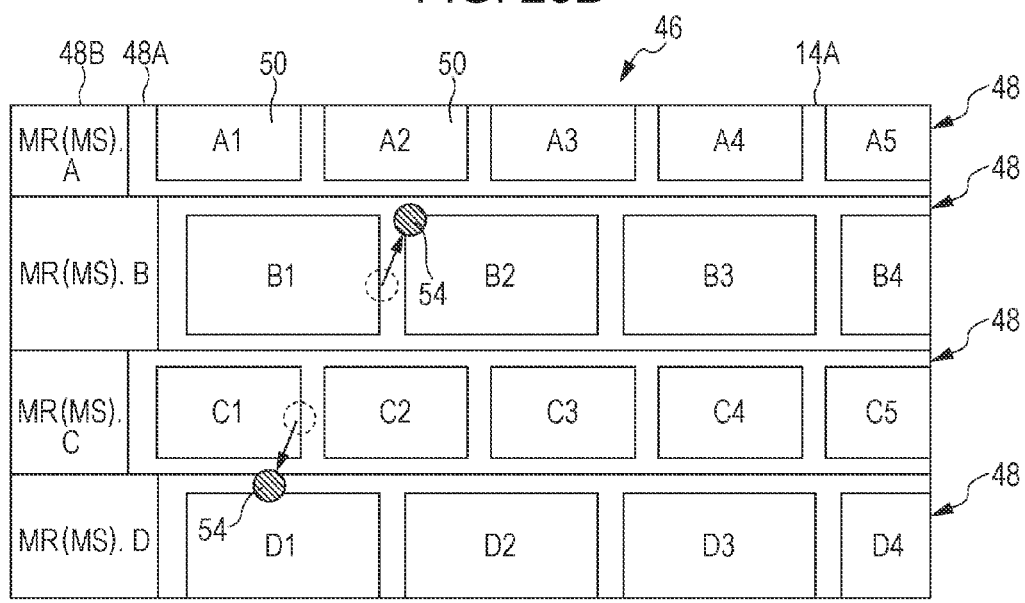

For example, as illustrated in FIG. 26A, it is assumed that the attribute display region 48B of the divided region 48 displaying the to-be-displayed images 50 of photographer A is specified, and similarly the attribute display region 48B of the divided region 48 displaying the to-be-displayed images 50 of photographer C is specified. In this case, the controller 38 regards the unspecified divided region 48 displaying the to-be-displayed images 50 of photographer B and the unspecified divided region 48 displaying the to-be-displayed images 50 of photographer D as extracted regions. Thus, as illustrated in FIG. 26B, it is assumed that two positions are specified in the image display regions 48A, and the specified positions 54 move in a direction in which the specified positions 54 come apart from each other in the dividing direction. In this case, the controller 38 enlarges the divided region 48 displaying the to-be-displayed images 50 of photographer B and the divided region 48 displaying the to-be-displayed images 50 of photographer D.

In the seventh exemplary embodiment, in determination in step S701 of whether the attribute display region 48B is specified, it is determined that the attribute display region 48B is specified when the attribute display region 48B is touched via the operation panel 14B. However, the seventh exemplary embodiment is not limited to this case. That is, as illustrated in FIG. 26A, when one position in the attribute display region 48B is specified, and then an operation of moving the specified position 54 to an end portion of the display region of the display panel 14A is performed, it may be determined that the attribute display region 48B is specified. At this time, in order to enable a user to intuitively recognize the specified attribute display region 48B, as illustrated in FIG. 26A, the divided region 48 of the specified attribute display region 48B may be moved a little bit in the arrangement direction in accordance with the movement of the specified position 54 and may be displayed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method of controlling a display control apparatus, the method comprising:

dividing, by at least one hardware processor, a display region of a display into a plurality of divided regions in which a plurality of images are displayed according to an attribute of the plurality of images;

detecting, by the at least one hardware processor, a first designation of a first position in a first divided region;

detecting, by the at least one hardware processor, a second designation of a second position in a second divided region while performing the detecting of the first designation;

detecting, by the at least one hardware processor, a first operation on the display region after the detecting the second designation, wherein the first operation includes a movement of the first position relative to the second position; and controlling, by the at least one hardware processor, an enlargement or a reduction of a size of a plurality of images of a target region including the first divided region and the second divided region, in response to the detecting of the first operation.

2. The method according to claim 1, wherein the controlling further includes:

enlarging the size of the plurality of images of the target region, in response to detecting the first operation that the first position and the second position move apart from each other in a determined direction, and reducing the size of the plurality of images of the target region, in response to detecting the first operation that the first position and the second position move closer to each other in the determined direction.

3. The method according to claim 1, wherein the target region includes the first of the divided regions and the second of the divided regions, in response to the second designation being detected within a predetermined time after detecting the first designation.

4. The method according to claim 1, wherein the target region includes a first sandwiched region which is one divided region from among the plurality of divided regions sandwiched by the first region and the second region.

* * * * *